United States Patent
Rangasamy et al.

(10) Patent No.: US 12,346,304 B2
(45) Date of Patent: Jul. 1, 2025

(54) LOCK MANAGEMENT FOR DISTRIBUTED APPLICATION PODS

(71) Applicant: Oracle International Corporation, Redwood Shores, CA (US)

(72) Inventors: Venkatachalam Rangasamy, Fremont, CA (US); Jaganathan Jeyapaul, Saratoga, CA (US); Jeffrey Trent, Medford, NJ (US); Jay Hiremath, Tracy, CA (US); Senthilkumar Somasundaram, Fremont, CA (US); Krithika Bharathi Sundaram, Bangalore (IN); Parvathy Unnikrishnan, Bangalore (IN); Vijay Bhasker Mula, Reddy District (IN); Esha Sharma, Hayward, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 86 days.

(21) Appl. No.: 17/068,020

(22) Filed: Oct. 12, 2020

(65) Prior Publication Data

US 2022/0114157 A1   Apr. 14, 2022

(51) Int. Cl.
*G06F 9/50* (2006.01)
*G06F 8/65* (2018.01)
(Continued)

(52) U.S. Cl.
CPC .......... *G06F 16/2343* (2019.01); *G06F 8/65* (2013.01); *G06F 8/658* (2018.02); *G06F 9/5038* (2013.01); *G06F 9/5077* (2013.01); *G06F 9/526* (2013.01)

(58) Field of Classification Search
None
See application file for complete search history.

(56) References Cited

U.S. PATENT DOCUMENTS 6,816,952 B1 *  11/2004  Vartti ................. G06F 12/0815
                                                              711/163
7,756,846 B2 *   7/2010  Klein ................. G06F 16/2343
                                                              707/704
(Continued)

FOREIGN PATENT DOCUMENTS

CN      109032758      12/2018
CN      109542605       3/2019
(Continued)

OTHER PUBLICATIONS

"Optimization for Container Platforms", Kubernetes, Densify, Available Online at: https://cloud.ibm.com/docs/containers?topic=containers-psp#customize_psp, Accessed from Internet on Oct. 15, 2020, 13 pages.

(Continued)

*Primary Examiner* — Abu Zar Ghaffari
(74) *Attorney, Agent, or Firm* — Kilpatrick Townsend & Stockton LLP

(57) ABSTRACT

Instances of an application pod may be deployed to many different computing environments spanning native cloud installations, SaaS providers, and on-premise data centers. In order to make uniform changes to a distribution of an application pod, a lock manager may receive and schedule lock requests from many different types of utilities. These utilities may schedule exclusive locks on the application pod throughout the different computing environments, such that patches, updates, security protocols, and other changes may be instituted without interference from changes made concurrently by other utilities. The lock manager may schedule immediate and future locks, with lock extensions and lock overrides available for flexibility.

17 Claims, 16 Drawing Sheets

(51) Int. Cl.
*G06F 8/658* (2018.01)
*G06F 9/52* (2006.01)
*G06F 16/23* (2019.01)

(56) References Cited

U.S. PATENT DOCUMENTS

| | | | | |
|---|---|---|---|---|
| 11,539,602 | B2* | 12/2022 | Shishir | H04L 63/1408 |
| 2006/0212573 | A1* | 9/2006 | Loaiza | G06F 15/173 |
| | | | | 709/225 |
| 2007/0244962 | A1* | 10/2007 | Laadan | G06F 9/45504 |
| | | | | 709/201 |
| 2008/0071997 | A1* | 3/2008 | Loaiza | G06F 9/526 |
| | | | | 710/200 |
| 2010/0036844 | A1* | 2/2010 | Butler | G06F 16/2343 |
| | | | | 707/704 |
| 2013/0144853 | A1* | 6/2013 | Kohno | G06Q 40/02 |
| | | | | 707/704 |
| 2014/0365549 | A1* | 12/2014 | Jenkins | G06F 9/526 |
| | | | | 709/201 |
| 2017/0163762 | A1* | 6/2017 | Nguyen | G06F 16/2343 |
| 2019/0236292 | A1* | 8/2019 | Bartolotta | G06F 8/65 |
| 2020/0192690 | A1* | 6/2020 | Gupta | H04L 67/34 |
| 2020/0241865 | A1* | 7/2020 | Phong | G06F 8/71 |
| 2020/0250006 | A1* | 8/2020 | Parekh | H04L 67/1008 |
| 2020/0250009 | A1* | 8/2020 | Jaeger | H04L 63/20 |
| 2020/0280613 | A1* | 9/2020 | Baldassarre | G06F 16/275 |
| 2021/0382636 | A1* | 12/2021 | Perumal | G06F 3/0622 |
| 2022/0027322 | A1* | 1/2022 | Sproat | G06F 9/526 |
| 2022/0171758 | A1* | 6/2022 | Agrawal | G06F 16/2237 |

FOREIGN PATENT DOCUMENTS

| | | | | |
|---|---|---|---|---|
| CN | 109885389 | | 6/2019 | |
| CN | 110851236 | | 2/2020 | |
| CN | 111610992 A | * | 9/2020 | G06F 8/65 |
| CN | 113821268 A | * | 12/2021 | |

OTHER PUBLICATIONS

"Configuring Pod Security Policies", IBM, Available Online at: https://cloud.ibm.com/docs/containers?topic=containers-psp#customize_psp, Accessed from Internet on Oct. 15, 2020, last updated May 5, 2020, 10 pages.

"Updating Your Horizon Cloud Pod", VMware Horizon Cloud Service, Available Online at: https://docs.vmware.com/en/VMware-Horizon-Cloud-Service/services/hzncloudmsazure.admin15/GUID-9ED914D8-F759-4602-AEFF-AA1388D6D6CA.html, Accessed from Internet on Oct. 15, 2020, last updated Jul. 3, 20206 pages.

* cited by examiner

LOCK MANAGEMENT FOR DISTRIBUTED APPLICATION PODS

BACKGROUND

In the abstract, containers in any form represent a standardized method of packaging and interacting with information. Containers can be isolated from each other and used in parallel without any risk of cross-contamination. In the modern software world, the term "container" has gained a specific meaning. A software container, such as a Docker® container, is a software construct the logically encapsulates and defines a piece of software. The most common type of software to be encapsulated in the container is an application, service, or microservice. Containers may be used to form pods, which represent full encapsulations of applications that can be deployed to many different types of environments. Pods may include all of the software support required for the application/service to operate, such as an operating system, libraries, storage volumes, configuration files, application binaries, and other parts of a technology stack that would be found in a typical computing environment. A pod may also include resources, such as computer resources, storage resources, network resources, and so forth. Pods may be deployed in a production data center, an on-premises data center, a cloud computing platform, a SaaS environment, as native-cloud applications, and any other computing environment.

While application pods are very tools versatile in modern computing, they also represent unique challenges when it comes to the lifecycle management activities that may be performed during the pod lifecycle. A single pod may be deployed to many different tenants in a cloud environment, to different types of cloud environments, to customer data centers, and/or to many other different operating environments. Each of these environments may also have dozens or even hundreds of application pods operating together in the environment. Compounding the complexity of these deployments is the number of utilities that may provide changes or updates to each of the application pods. When updates from various utilities conflict, application pods in some environments may become unstable, or may at least exist in a different configuration than otherwise identical pods in other environments. Therefore, improvements in this technology are needed to manage lifecycle management activities for application pods.

BRIEF SUMMARY

Instances of application pods that are distributed across various computing environments may avoid the instability caused by competing upgrades or changes that overlap in time by using a pod lock manager to schedule and arbitrate between different lifecycle management (LCM) systems. Instead of deploying an update or change to all the deployed instances of an application pod when the update is ready, and LCM utility may submit a request to the pod lock manager to schedule exclusive change access to the distributed instances of the application pod. The pod lock manager may store a lock schedule for the different application pods in the ecosystem, and it may grant locks on those application pods such that the LCM utilities can be guaranteed exclusive access as they provide updates and changes. The pod lock manager may act as a central authority and arbitrator for the many-to-many connections between LCM utilities and deployed application pods.

A lock that is provided by the pod lock manager need not affect the functionality of the application pod at all. Each of the application pod instances may remain online for customer use. However, as the LCM utilities funnel their changes through the schedule data structures that are maintained by the pod lock manager, the different upgrades can be exclusively scheduled to avoid collisions. The pod lock manager may receive requests and determine whether a lock can be granted at the specified time interval. If the lock is available, or if a current lock can be overridden, the pod lock manager may grant the lock to the requesting utility for a defined time interval. When the utility that holds the lock finishes making changes to the deployed instances of the application pod, the utility may submit a request to release the lock, or the lock may expire at the end of the scheduled time interval. Some embodiments may allow the lock holder to request an extension to the time interval, provided the extension does not conflict with other scheduled LCM utilities.

The pod lock manager allows utilities to schedule changes to deployed instances of the application pod across cloud environments, native-cloud installations, SaaS environments, on-premise data systems, and any other computing environment. The pod lock manager may also provide real-time status for locks granted to any of the application pods in the ecosystem, regardless of where application pods are deployed. A heterogeneous mix of LCM utilities may be compatible with the application pod, such as development updates, patches, security upgrades, introspection services, metadata services, and so forth. For example, the pod lock manager may provide public Application Programming Interfaces (APIs) that can receive Representational State Transfer (REST) interface commands (e.g., GET, POST, etc.) to receive status information, override existing locks, obtain new locks, and release locks.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for managing update activities throughout an application pod ecosystem. A number of different utilities, such as development teams, patch teams, requests for capacity increase, language pack enablements, data security teams, metadata introspection utilities, and so forth, may provide processes that change an aspect of an application pod. These processes may include patches, updates, or other enhancements to the functionality of an application pod. In order to avoid conflicts between different updates provided by these different utilities, a pod lock manager may maintain a schedule of update activities to be executed on each application pod. Instead of pushing out updates to application pods when they are ready, utilities may request a lock from the pod lock manager that reserves a time window during which the utility may have exclusive access to update the application pod. As long as the utility holds the lock, the utility may execute the update on all of the application pod instances that are installed in different operating environments. For example, holding the lock for an application pod may apply to instances of the application pod that are installed in cloud environments, SaaS environments, customer data centers, and/or any other deployment environment. Locks can expire and/or be extended if necessary, and the utility may release the lock when the update is complete. The pod lock manager may thus represent a central scheduling system to coordinate updates between a plurality of source utilities that target a plurality of application pods in different operating environments.

Figure 1:
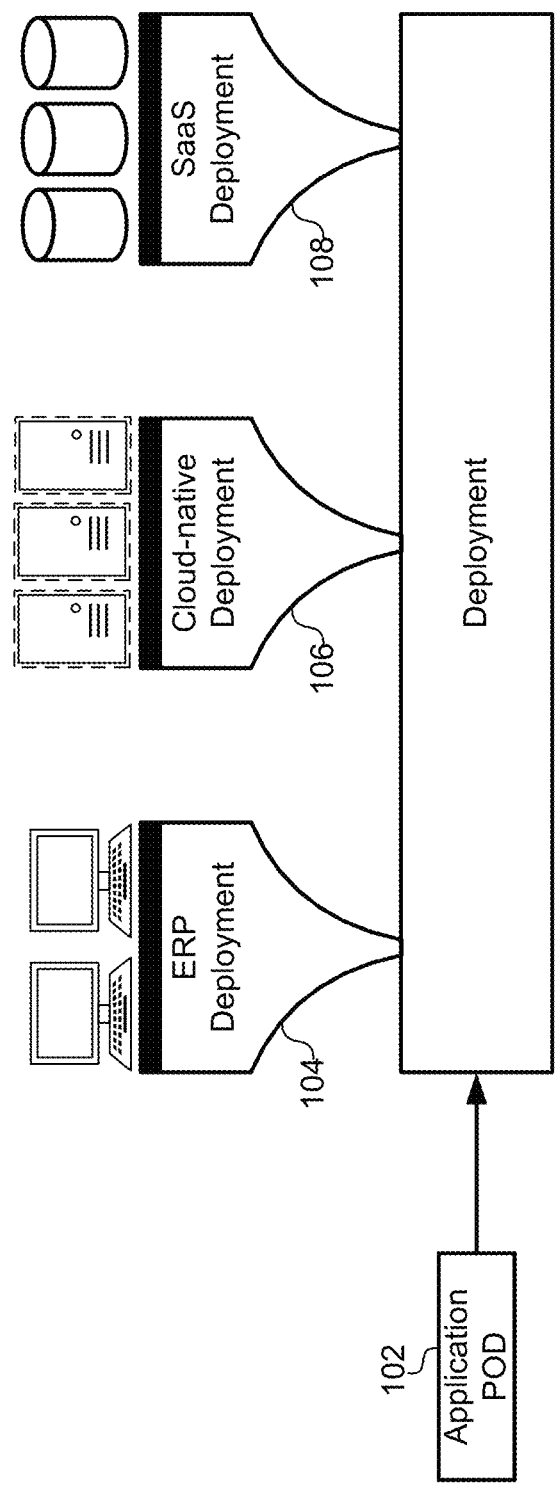
FIG. 1 illustrates how instances of a single application pod may be distributed and deployed to a plurality of different operating environments, according to some embodiments.

FIG. 1 illustrates how instances of a single application pod 102 may be distributed and deployed to a plurality of different operating environments, according to some embodiments. By way of example, the application pod 102 may be deployed through a number of different deployment channels into different environments. These different environments may include an enterprise resource planning (ERP) deployment 104 that is part of a customer's on-premise data center. Instances of the application pod 102 may also be deployed to cloud computing environments, which may include cloud-native deployments 106. These deployments may be entirely built into the cloud as part of the environment. Some embodiments may also deploy instances of the application pod 102 into a Software as a Service (SaaS) deployments 108. The SaaS deployments 108 may represent a software distribution model that allows the pot application 102 to be hosted or managed in a cloud environment and accessed by subscribers or tenant customers. Other deployments not shown exposing in FIG. 1 may also be supported by some embodiments. These deployments may include an Infrastructure as a Service (IaaS) cloud computing environment. This is a form of cloud computing that provides virtualized or shared computing resources over a network. The IaaS cloud computing environment may also include or be coupled with other cloud computing environments arranged as Platform as a Service (PaaS) architectures. In this environment, the cloud provider can host an infrastructure of hardware and/or software components that were traditionally present in an on-premises data center. This hardware may include servers, storage, networking hardware, disk arrays, software libraries, and virtualization utilities such as a hypervisor layer. The IaaS environment can be provided by a commercial source, such as Oracle® or other publicly available cloud platforms. The IaaS environment may also be deployed as a private cloud using a private infrastructure of hardware and software.

Regardless of the type of cloud environment, the service application pod 102 may be deployed onto a number of different types of hardware/software systems. For example, the application pod 102 may be deployed to dedicated hardware. The dedicated hardware may include hardware resources, such as servers, disks, operating systems, software packages, and so forth, that are specifically assigned to the application pod 102. For example, a specific server may be allocated to handle traffic flowing to and from the application pod 102.

In another example, the application pod 102 may be deployed to a container platform. The container platform differs from the virtual machines in a number of important ways. First, the container platform packages individual services into containers. Each container may share a host operating system kernel. They may also share binaries, libraries, and other read-only components. This allows containers to be exceptionally light-often only a few megabytes in size. Additionally, a lightweight container is very efficient, taking just seconds to start versus the minutes required to boot up a virtual machine. Containers also reduce management overhead by sharing the operating system and other libraries that can be maintained together for the entire set of containers in the container platform. Even though containers may share the same operating system, they may also provide an isolated platform, as the operating system provides virtual-memory support for isolation. Container technologies may include Docker® containers, the Linux Libcontainer®, the Open Container Initiative (OCI), Kubernetes®, CoeOS, Apache® Mesos, along with others. These containers may be deployed to a container orchestration platform, which may be referred to herein as simply the "container platform." A container platform manages the automated arrangement, coordination, and management of deployed software containers. The container platform may provide service discovery, load-balancing, health checks, multiple deployments, and so forth. The container platform may be implemented by any publicly available container platform, such as Kubernetes, that runs containers organized in nodes and pods.

The application pod 102 may be widely deployed to many of the different deployments 104, 106, 108. Because the application pod 102 is encapsulated as an operating entity, it can operate on different platforms in many different locations. Therefore, it should be apparent that the application pod 102 may be subject to wide distribution among different cloud platforms, infrastructure services, and customer data centers.

Although the examples above allow the service 114 to be deployed to any of the described platforms 104, 106, 108, some embodiments described herein may be specifically designed for the container platform described above. Thus, embodiments that are specifically recited to be deployed in a "container platform" or "container environment" can be distinguished from other embodiments that are specifically recited to be deployed in a virtual machine platform, on the server or dedicated hardware platform, or generally in an IaaS environment.

Figure 2:
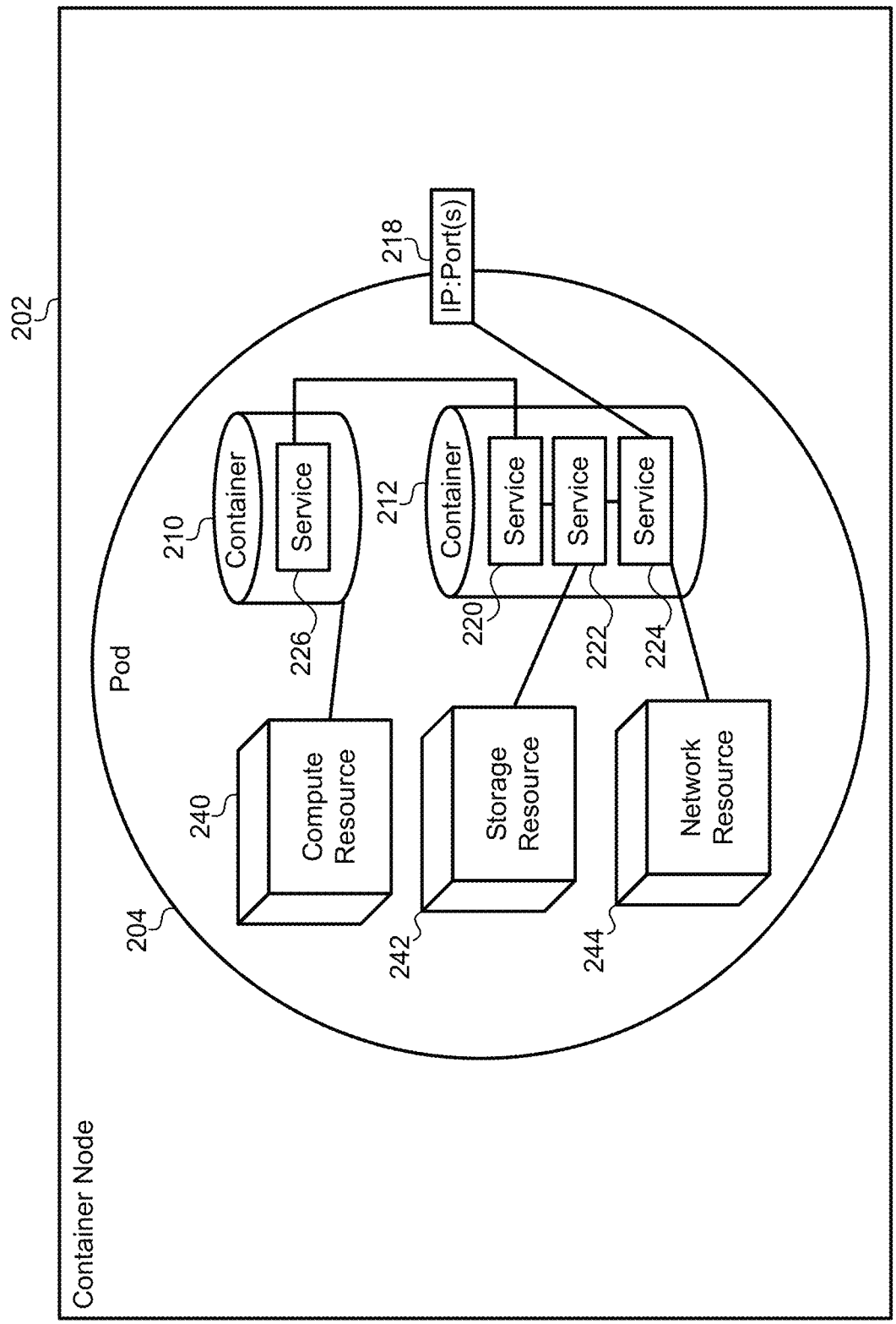
FIG. 2 illustrates an example of an application pod, according to some embodiments.

FIG. 2 illustrates an example of an application pod, according to some embodiments. An application pod may be an abstraction that represents an integrated, self-contained application (e.g., Docker or rkt). An application pod may also include some shared resources that are commonly available to all of the containers within the pod. For example, the application pod 204 in this example may include container 210 and container 212. The application pod 204 may also include shared resources, such as computer resources 240, storage resources 242, network resources 244, and/or the like. The pod 204 may model an application-specific logical host that contains different service containers 210, 212 that are relatively tightly coupled. For example, service 226 in container 210 can utilize the compute resource 240 and call service 220 in container 212. Service 220 can also call service 222, which in turn calls service 224, each of which are deployed to container 212. The output of service 224 can be provided to a network IP address and port 218, which may be another common resource shared by the pod 204. Thus, the services 220, 222, 224, 226 may all work together with the shared resources 240, 242, 244 to provide all of the functionality of the application.

The application provided by the application pod 204 may be relatively simple, but it may also be very large and complex. For example, the application pod 204 may provide a large enterprise software package, such as CRM applications, HRM applications, planning applications, IT management applications, business intelligence applications, application integration applications, enterprise forms automation applications, and so forth. Therefore, the simplified example of an application pod 204 illustrated in FIG. 2 is provided only by way of example, and it is not meant to be limiting. Other application pods need not use orchestration environments or logical containers, but may instead use other forms of encapsulating an application into a logical entity. For example, some application pods may be distributed as executable software packages written in any computer language and configured to operate in any computing environment.

Figure 3:
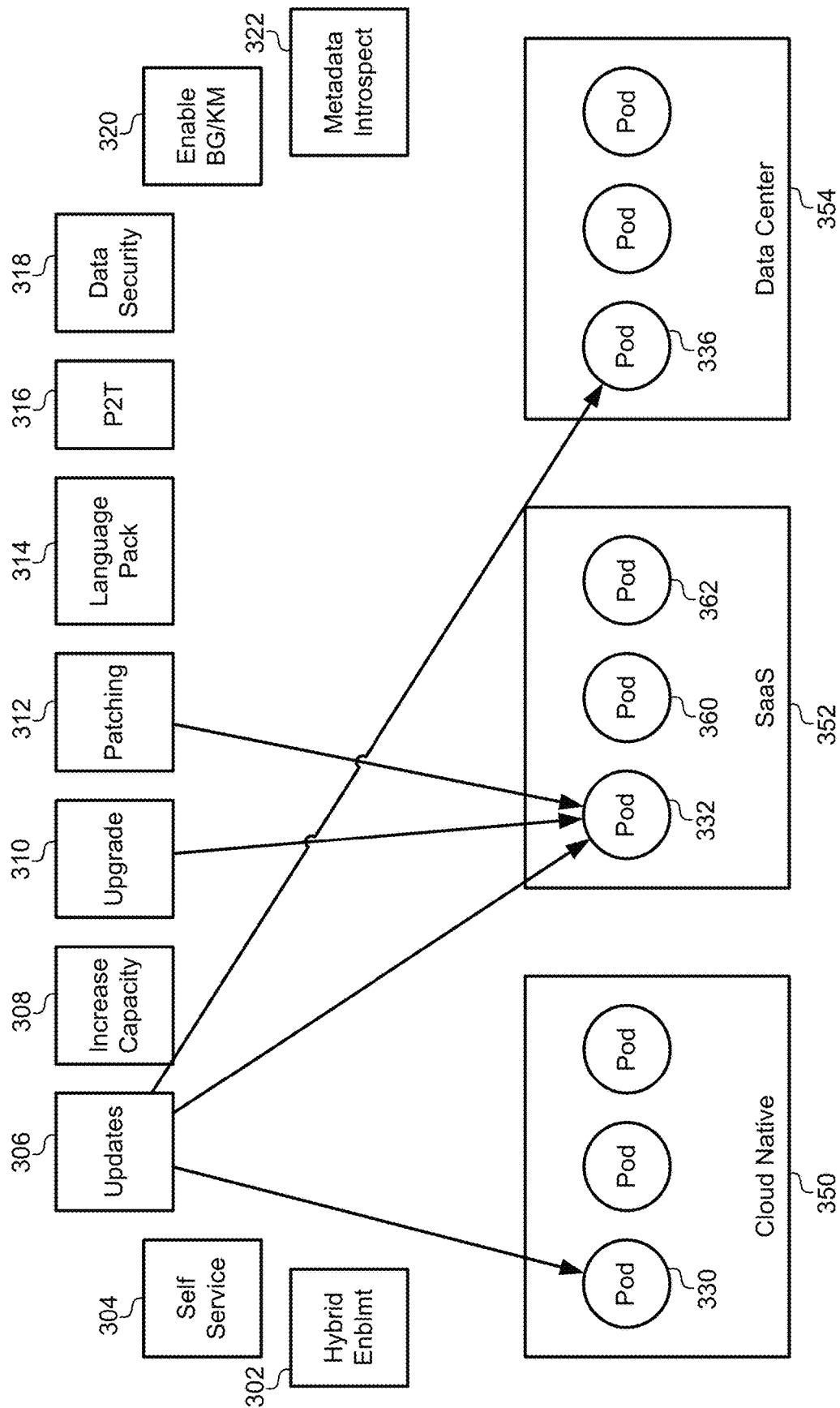
FIG. 3 illustrates a simplified block diagram of utilities that provide updates to a plurality of pods that are distributed through a plurality of different operating environments, according to some embodiments.

FIG. 3 illustrates a simplified block diagram of utilities that provide updates to a plurality of pods that are distributed through a plurality of different operating environments, according to some embodiments. As described above, instances of an application pod may be deployed to different operating environments. In this example, a first instance 330 of an application pod may be deployed to a cloud native environment 350. A second instance 332 of an application pod may be deployed to a SaaS environment 352. A third instance 336 of the application pod may be deployed to a customer data center 354. Each of these pod instances 330, 332, 336 may represent different operating instances of the same application pod deployed from a development team. Each of the different operating environments 350, 352, 354 may be physically and/or logically separated from each other. For example, the data center 354 may be operated on hardware/software that is hosted at a physical location that is different from the hardware/software that hosts the cloud native environment 350. Each of the different operating environments 350, 352, 354 may also be owned/operated by different entities. For example, the SaaS environment 352 may be provided and operated by a cloud service provider, while the data center 354 may be owned and operated by a company or customer that is separate and distinct from the cloud service provider. Additional operating environments may also include instances of the pod application that are not illustrated explicitly in FIG. 3.

To complicate matters further, each of the operating environments 350, 352, 354 may include a plurality of different application pods that operate in those environments. For example, the SaaS environment 352 may include an instance of the application pod 332 described above, as well as additional application pods 360, 362, etc., that may also operate in the SaaS environment 352. Thus, not may multiple instances of a single application pod be deployed across multiple operating environments, each of the operating environments may include a large plurality of application pods that operate together in the operating environment.

Application pods may frequently be updated and/or otherwise changed after their initial deployment. There may be many sources of these changes, all of which may compete for time during which those changes may be pushed to the multiple instances of an application pod. FIG. 3 illustrates an example of some of the different utilities that may push changes out to application pods or which otherwise may benefit from having exclusive access to the application pod. Each of these different entities, applications, or processes that provide changes for application pods may be referred to generally as "utilities" herein. The utility may be defined as any entity that provides a process configured to change an application pod. A utility may also be a process that executes to retrieve data from the application pod under the assumption that no changes are made to the application pod while that data is retrieved. The following is a non-limiting list of example utilities that may provide processes that are configured to change an application pod or which otherwise benefit from exclusive access to the application pod. Other utilities may also fall within the scope of this definition that are not explicitly recited below, but which function in a similar fashion.

An update utility 306 may receive requests from a customer to add additional functionality to an existing application pod. For example, an upgrade may add additional features that required new virtual machines to be created for the application pod. An increase capacity utility 308 may include requests to increase storage capacity, compute capabilities, or any other computing resource used by the application pod. An upgrade utility 310 may push an upgrade out to each instance of the application pod at regular intervals to upgrade a version of the software. A patching utility 312 may provide patches that repair bugs or improve the functionality of the application pod. A language pack enablement utility 314 may activate new languages for an application pod. A production-to-test (P2T) utility 316 may perform data migration operations for the application pod. A data security utility 318 may alter security settings or policies used by the application pod, including authentication, encryption, key management services, and so forth. Similarly, an enable a Break Glass/Key Management (BG/KM) utility 320 may be used to enable security features, such as a Break Glass® security layer, a key management utility, and so forth. A self-service utility 304 may perform self checks and/or self-diagnostic operations on the application pod. A hybrid enablement utility 302 may hybridize the application pod in a cloud infrastructure. A metadata introspection utility 322 may periodically run an introspection routine to generate a self-description of the application pod. Other utilities may also provide changes and/or benefit from having exclusive access to an application pod that are not explicitly described above, but which operate in similar fashion.

FIG. 3 illustrates some of the many technical problems that accompanies this distributed application pod ecosystem. Multiple utilities may try to push changes or perform operations that benefit from exclusive access to a single application pod at the same time. For example, the update utility 306, the upgrade utility 310, and the patching utility 312, may all attempts attempt to change and/or exclusively access the instance of the application pod 332 operating in the SaaS environment 352 at the same time. Each of these utilities 306, 310, 312 may expect that their operations are atomic and that other changes to the application pod 332 are not being made concurrently by other utilities. When multiple utilities execute changes or otherwise expect exclusive access to an application pod, these changes may cause the application pods become unstable when that assumption is not met. For example, the upgrade utility 310 may change the application pod such that a patch provided by the patching utility 312 is no longer compatible with the application pod. Because of the large number of utilities that may provide changes or the application pod 332, it is not practical to try and accommodate the exponential number of collisions that may occur between different utilities.

In addition to interference between various utilities trying to access the application pod 332 at the same time, technical problems may also occur when a single utility attempts to change all of the different deployments of an application pod across the different operating environments 350, 352, 354. Instances of the application pod may interact with each other across different operating environments. Patches, upgrades, capacity increases, and/or other utilities may assume that all instances of an application pod are uniform across the different operating environments 350, 352, 354 when they perform their operations. Thus, deployments of an application pod will benefit from ensuring that an atomic change that can be made uniformly during a same time interval across all of the different deployments.

Figure 4:
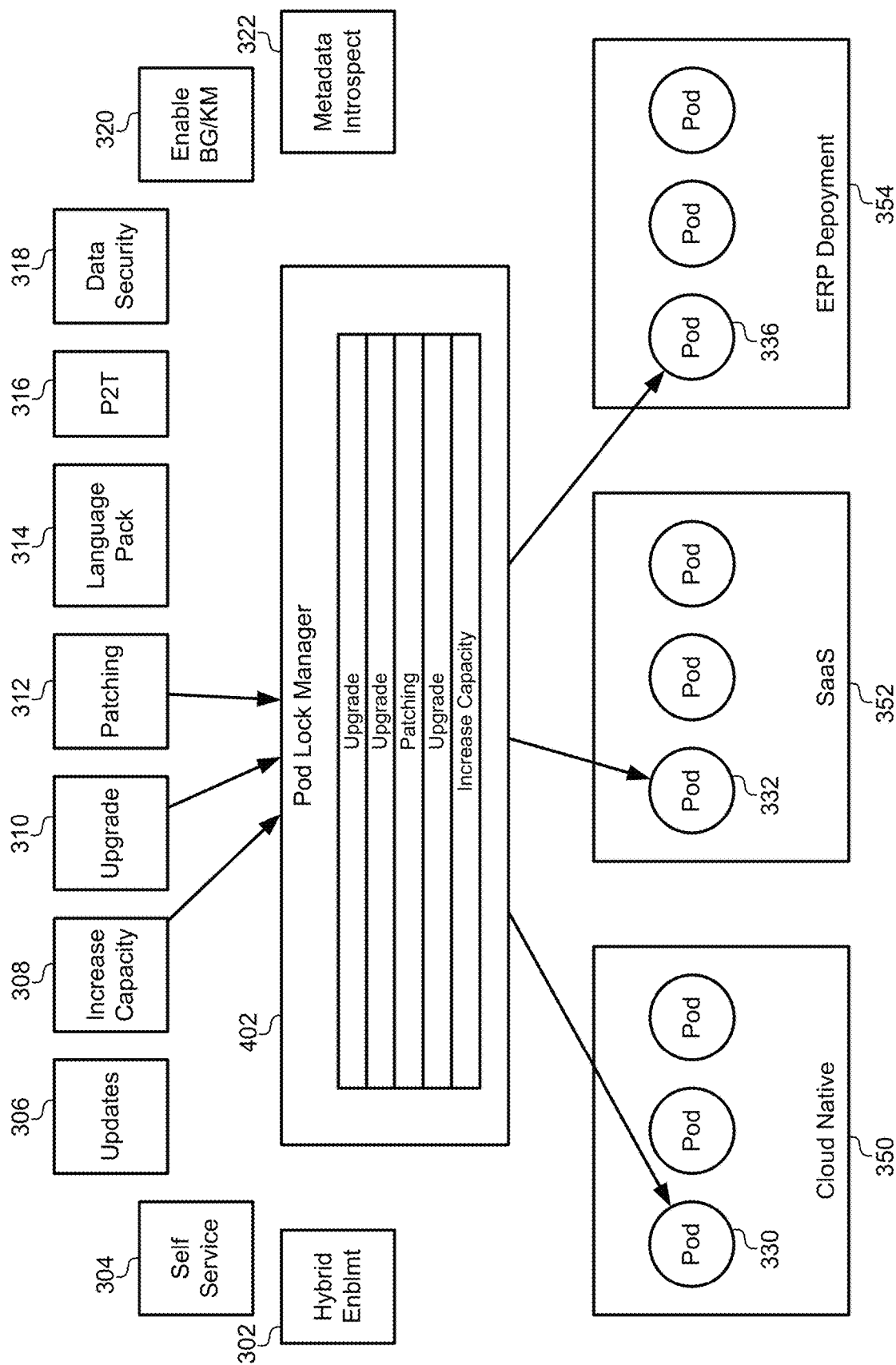
FIG. 4 illustrates an example of a pod lock manager that may coordinate exclusive access to application pods across a plurality of different operating environments, according to some embodiments.

FIG. 4 illustrates an example of a pod lock manager 402 that may coordinate exclusive access to application pods across a plurality of different operating environments, according to some embodiments. A pod lock manager 402 may be defined as a process that receives requests for exclusive access to an application pod from a plurality of different utilities. These utilities may originate from development/design teams, as well as operational teams. These requests may represent requests for exclusive access to all deployments of an application pod during a specified time interval. The pod lock manager 402 may receive each of these requests and maintain a schedule for each application pod. The pod lock manager 402 may then grant a lease or "lock" to individual utilities during exclusive time intervals. While a utility holds the lock on the application pod, it may assume that it has exclusive access to all instances of the application pod across all of the different deployments and operating environments. Thus, a utility holding a lock on an application pod may push changes, including capacity increases, patches, updates, security features, and so forth, out to each of the deployments of the application pod without risking interference from other applications. Similarly, this utility may perform introspection or other operations that assume exclusive access to the application pod while the utility holds the lock.

The pod lock manager 402 overcomes the technical problems described above and represents a practical application of the principles of exclusive access to a computing utility. In this practical application, the pod lock manager 402 acts as a scheduler and/or an arbiter between the many different utilities that compete for exclusive access to an application pod. The pod lock manager 402 also ensures that changes can be pushed out to all of the application pod deployments at the same time without interference. This allows all instances of an application pod to be uniform throughout the different operating environments. This also prevents application pods from becoming unstable as multiple utilities try to change the application pod at the same time. Additionally, the pod lock manager 402 allows information to be extracted from the application pod without the threat of concurrent changes to the application pod invalidating that information.

Figure 5:
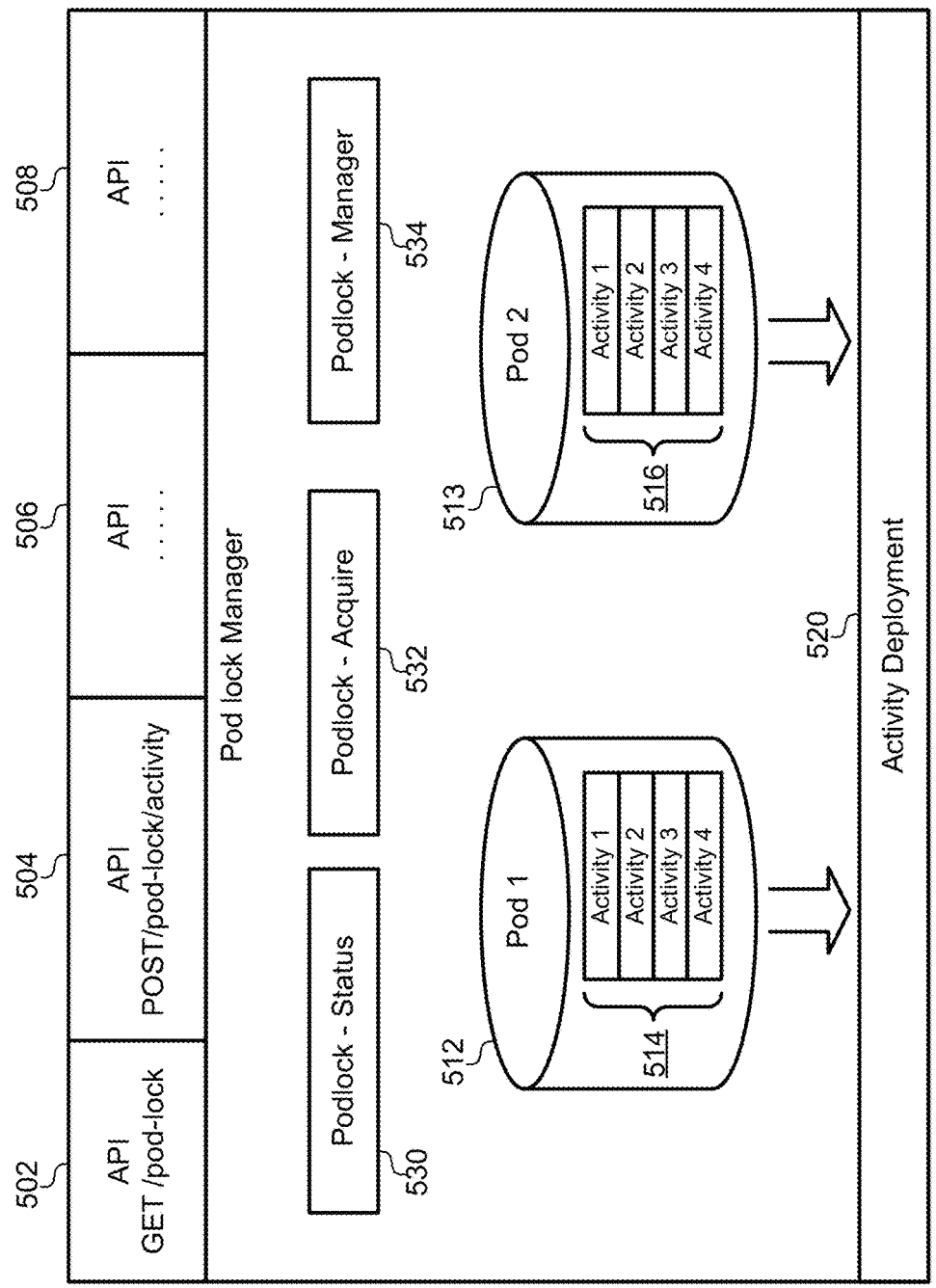
FIG. 5 illustrates a simplified block diagram of an architecture for the pod lock manager, according to some embodiments.

FIG. 5 illustrates a simplified block diagram of an architecture for the pod lock manager 402, according to some embodiments. The pod lock manager 402 may include a public interface that allows the utilities described above to submit requests and retrieve information regarding locks that have been granted and/or scheduled. In this example, the public interface may include a plurality of Application Programming Interfaces (APIs) 502, 504, 506, 508 that allow access to lock schedules and/or to schedule locks themselves on the application pods. A number of operations that may be carried out using the APIs are described in detail below. In some embodiments, the APIs may conform to a REST interface using GET, POST, etc., operations. For example, the APIs 502, 504, 506, 508 may be implemented using REST APIs that accept JSON objects for request payloads and provide responses in JSON objects.

The pod lock manager 402 may include one or more data stores 512, 513 that store schedules of locks that will be assigned to various utilities in discrete time intervals. For example, data store 512 may store a schedule for locks that are scheduled for application pod 1. A data structure 514 may include blocks of time that are assigned to individual utilities for that application pod. Optionally, the data structure 514 may also include a description of an activity to be performed by the utility that has reserved the lock. The description of the activities may be used to determine whether or not a lock may be overridden by a subsequent request. The process for overwriting an existing lock is described in greater detail below. Similarly, data store 513 may include a data structure 516 that schedules locks for application pod 2. A separate data structure may be maintained for each application pod that is managed by the pod lock manager 402. Thus, the pod lock manager 402 may maintain hundreds or thousands of data structures, each corresponding to individual application pods. Some embodiments may combine these data structures, for example, into database tables that may be referenced by utility and/or application pod identifiers.

The pod lock manager 402 may include a number of processes that perform different operations related to scheduling and accessing locks on various application pods. For example, a status process 530 may be used to ascertain a lock status for a particular application pod. The status process 530 may receive an identifier for an application pod, and may query the corresponding data store and/or data structure to retrieve a current status of a lock. A manager process 534 may be used to schedule available locks by inserting new lock data into the corresponding data store and/or data structure. An acquire process 532 may receive requests to acquire or schedule a new lock on the application pod. The acquire process 532 may interact with the status process 530 to first determine whether a lock is available, then may interact with the manager process 534 to request the lock. Some embodiments may optionally include an extend process (not shown) that handles requests to extend existing locks if they have not been released by the lock owner.

In some embodiments, the pod lock manager 402 may include a utility that causes activities to be deployed 520. For example, a message may be sent to a utility indicating that the scheduled activity may begin. Alternatively, a message may be sent to other utilities that handle the actual execution of processes that change the application pod and/or retrieve information from the application pod. Note that it is not necessary for the pod lock manager 402 to execute these processes or direct their execution. Instead, the utilities may carry out their activities independent of the pod lock manager 402. This is possible when the utilities all rely on the pod lock manager to guarantee that they have exclusive access if they are granted a lock.

Using the software architecture illustrated in FIG. 5, a description may now be provided for calls that may be made to the pod lock manager 402 to acquire locks, query the status of a lock, schedule future locks, extend a lock, release a lock, and so forth. Note that these operations are provided only by way of example and are not meant to be limiting. Specific examples of REST interface calls are provided as just one of many possible implementations for the pod lock manager 402. Other interfaces, parameters, functions, and syntax may be used depending on the particular implementation, all of which fall within the scope of this disclosure.

Figure 6:
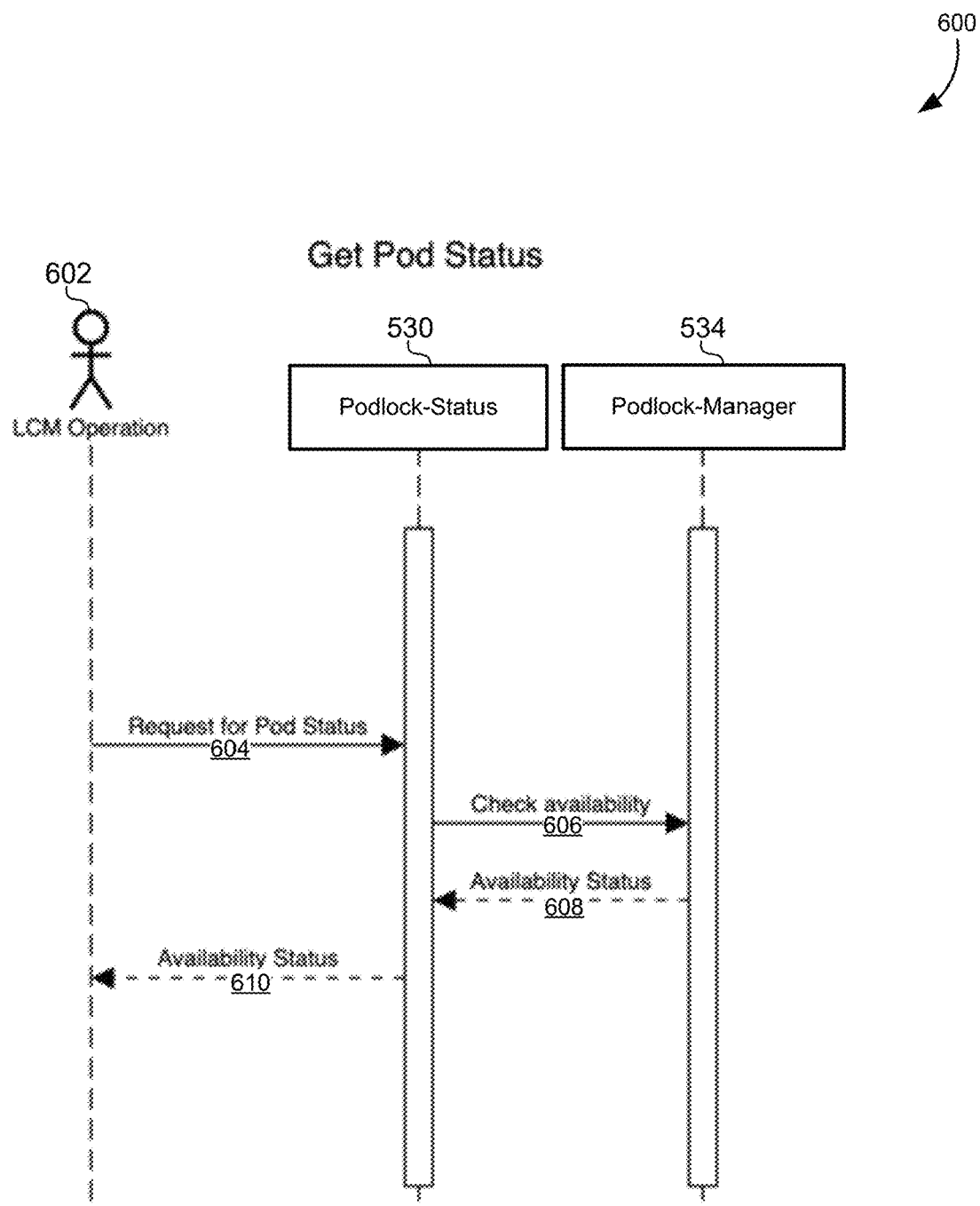
FIG. 6 illustrates a sequence diagram of a process for obtaining a pod status, according to some embodiments.

FIG. 6 illustrates a sequence diagram of a process for obtaining a pod status, according to some embodiments. Generally, utilities may check the status or availability of a lock on a particular application pod before trying to acquire a lock on the application pod. A status API may be used to ascertain the current status of a lock and to plan future lock activities. In this example, a status of a lock for a particular application pod may be requested by passing a flag indicating a type of information that is requested, such as (1) the availability of a lock on the application pod, or (2) the details of a current lock already existing on the application pod. For lock availability, a status string may be returned (e.g., AVAILABLE or UNAVAILABLE) and/or a numerical representation of these values. If a lock currently exists, the complete details of the existing lock may be returned.

This method may include receiving a request for the status of a particular application pod (604) from a utility 602. The status process 532 may receive the request and use the manager process 532 to check the availability of a current lock on the application pod (606). The manager process 534 may return and availability status (608) to the status process 532, which may pass the status back to the utility 602 (610). In some embodiments, the request for the pod status (604) may be understood to be a request for whether a current lock exists for the application pod. Other embodiments may also allow the request to specify a time or time interval in the future to return a status of a future lock interval, such that the utility 602 can schedule a future lock on the application pod.

In one particular example using a REST API, the following GET/pod-lock code may be used.
GET/Pod-Lock
1. (Required/Optional query param) podName—Name of the pod. Required when consumed from SaaS or Pod Manager layer
2. (Optional query param) statusOnly—Boolean. True returns the pod availability status for a lock. False returns all the current locks for the application pod.
Response
1. status—Availability status of the pod, AVAILABLE or UNAVAILABLE.
2. resultCode—Numerical representation of the status.
Example Code

```
Request: curl localhost/falcm-podlock/v1/pod-lock?statusOnly=true
Response:
{
  "status": "AVAILABLE",
  "resultCode": 0
}
```

Figure 7:
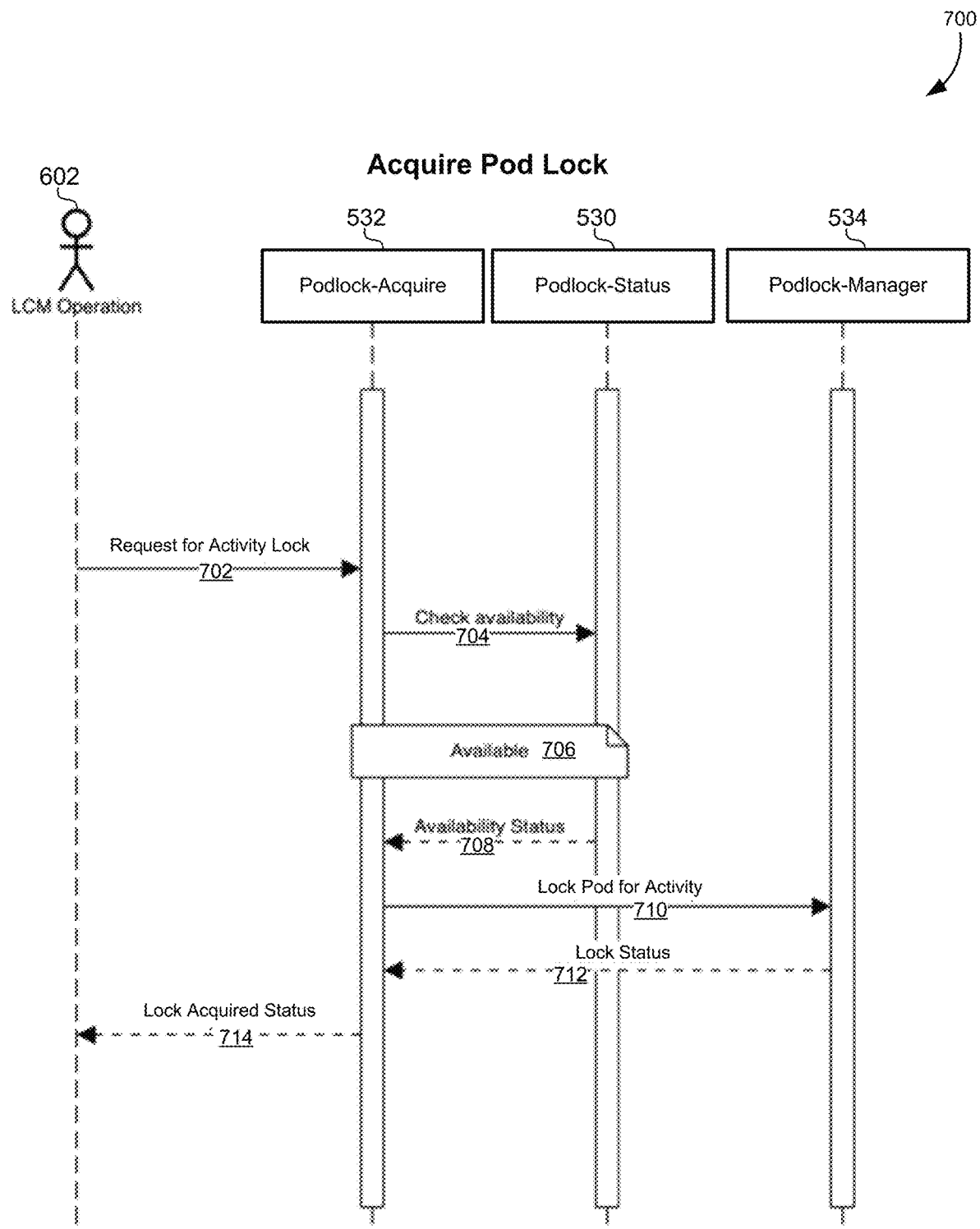
FIG. 7 illustrates a sequence diagram of a process for acquiring a lock on a pod, according to some embodiments.

FIG. 7 illustrates a sequence diagram of a process for acquiring a lock on a pod, according to some embodiments. When a utility 602 needs to acquire an activity lock, a request may be made through the corresponding API interface of the pod lock manager 402. An activity lock may be acquired by passing an identifier for the utility 602 making the request. This may include a logical name of the utility 602, development/ops team, or activity name associated with the request. Optionally, the request may also include a duration for the lock interval and/or a flag to request an override of an existing lock (along with a reason for overwriting). If these optional values are not sent, default values may be automatically inserted or used. An application pod name or identifier may also be provided when a request is made from a SaaS or other multi-pod environment.

The operation may begin by sending a request for an activity lock from the utility 602 to the corresponding API of the pod lock manager (702). The acquire process 532 may send a request (704) to check the availability of the lock to the status process 530. By default, the status process 530 made determine whether a lock currently exists for the application pod. In other embodiments, a specific future time for the lock request may be provided by the utility 602, and the availability at the given time may be investigated by the status process 530. For example, the status process may query the schedule data structure in the data store corresponding to the application pod. If the lock for the requested time interval is available (706) this indication may be returned as an availability status (708) to the acquire process 532. If the lock is not available at the given time, the acquire process 532 may return a status or result code indicating that the lock is not available.

If the lock is available, the acquire process 532 may next send a request to lock the application pod for a particular activity from the utility 602 (710). The lock may be scheduled for a duration specified in the request, or a default duration may be used. For example, specific activities (e.g., upgrade, introspection, increase capacity, etc.) may be associated with default times based on the length of those activities. The lock may be scheduled for a duration corresponding to what is needed for the activity to be carried out. The manager process 534 may add an entry to the schedule data structure corresponding to the application pod. A lock status may then be returned to the acquire process 532 (712), and the status may then be returned to the utility 602 (714).

In some embodiments, acquiring a lock on an application pod for a certain activity may also automatically lock particular tools or resources needed to perform that activity. For example, some software may be necessary for applying a patch or an upgrade to an application pod. Installer utilities may be required for increasing a capacity of an application pod. When a lock for an activity is requested, and/or when the lock is granted for the application pod, an additional lock may also be granted for tools that are required for that activity to be carried out. The pod lock manager may maintain a separate schedule for each tool that is available to the utilities for activities. Scheduling an activity may determine whether both the application pod and the tools used for the activity are available. Locks on tools or resources may use the same features described herein for locks on application pods (e.g., extensions, releases, overrides, etc.).

In one particular example using a REST API, the following POST/pod-lock/activity code may be used.

POST/Pod-Lock/Activity
1. (Required body param) ownerAgent—logical Name of the requester
2. (Required body param) activityName—Activity for which the lock is requested
3. (Required/Optional query param) podName—Name of the pod. Required when consumed from SaaS or Pod Manager layer
4. (Optional query param) lockDurationInSeconds—Lock Duration in seconds
5. (Optional query param) description—Description of the task
6. (Optional query param) override—Boolean. True will override existing lock. False will not override existing lock. Default is false
7. (Optional query param) reason—Reason for overriding existing activity lock Response
1. status—String message with the lock acquisition details.
2. resultCode—Numerical representation of the status.

Example Code

```
Request: curl -X POST -H "Content-Type: application/json" -d
'{"activityName":"export","ownerAgent":"exportAgent"}'
localhost/falcm-podlock/v1/pod-
lock/activity?lockDurationInSeconds=2160&podName=LCMSMYHQ1299
Response:
{
"status": "An activity lock is acquired successfully",
"resultCode": 0
}
```

Figure 8:
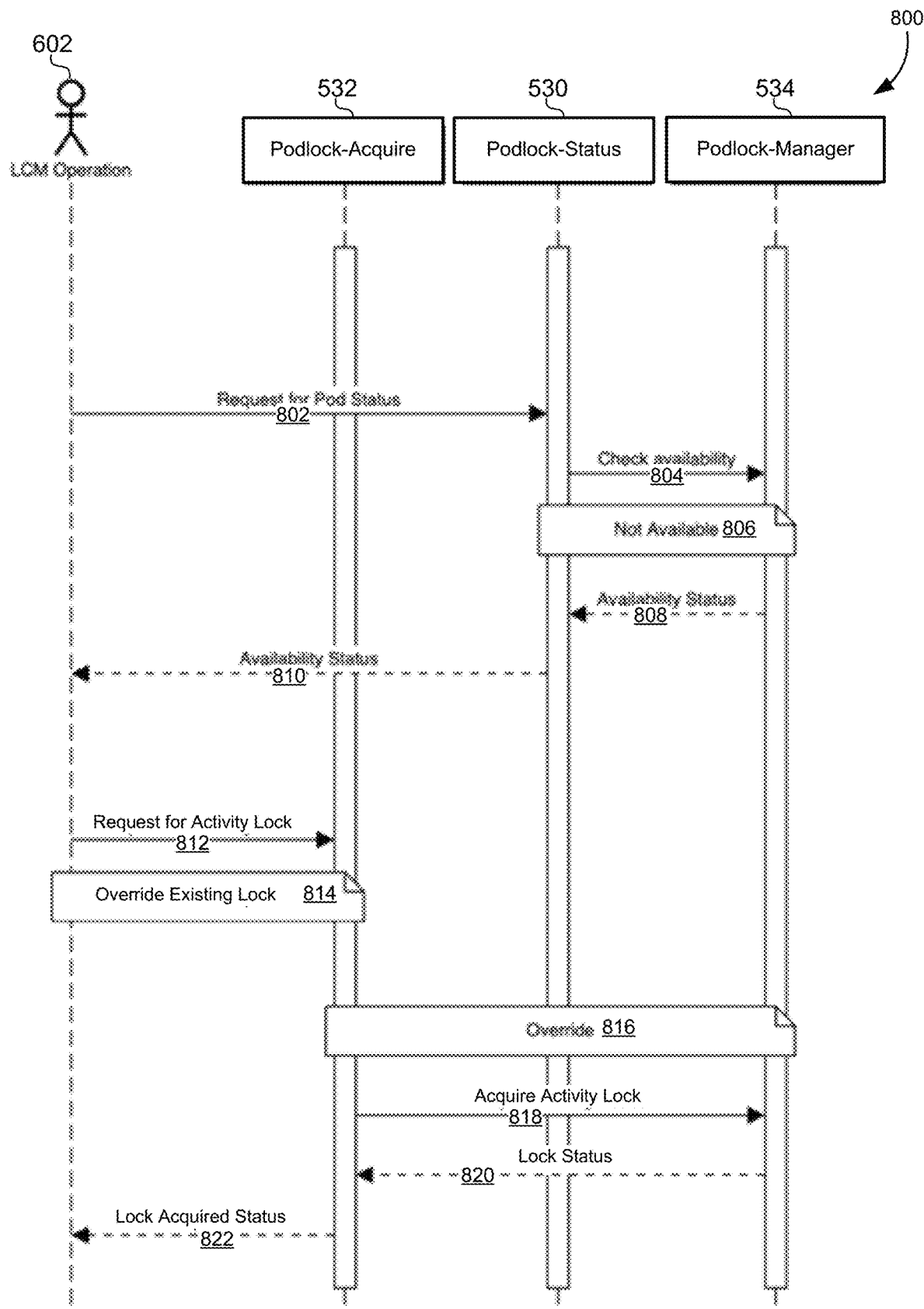
FIG. 8 illustrates a sequence diagram of a process for acquiring a lock on an application pod by overriding an existing lock, according to some embodiments.

FIG. 8 illustrates a sequence diagram of a process for acquiring a lock on an application pod by overriding an existing lock, according to some embodiments. When a utility 602 needs to acquire activity lock by overriding an existing lock, the corresponding API may receive an override request. The override request may set the flag described above indicating that the existing lock should be overridden. Again, the request may include an identifier for the utility 602, an activity name/description, and have the override flag set to true. This option to override may typically be exercised on rare occasions, and may require an administrative user to approve and/or submit the request. For a successful lock acquisition, a status may be returned with a string message or numerical representation of the result.

As illustrated in FIG. 8, a request for the pod status (802) may be sent from the utility 602 to the status process 530. The status process may query that manager process 534 check the availability (804) of a current lock. If another utility currently holds a lock on the application pod, an unavailable (806) status may be returned (808), which may be passed from the status process 530 back to the utility 602 (810).

If an activity to be performed by the utility 602 is urgent, the utility 602 may submit a request (812) with a flag indicating that the request should override the existing lock (814). The acquire process 532 may then determine whether the override should be granted (816). If the override is granted, the acquire process 532 may request a new lock be granted by the manager process 534 that terminates an existing lock (818). Once the lock is granted, the status may be passed back to the acquire process 532 (820), and then passed back to the utility 602 (822).

In one particular example using a REST API, the following POST/pod-lock/activity code may be used.

POST/Pod-Lock/Activity
1. (Required body param) ownerAgent—logical Name of the requester
2. (Required body param) activityName—Activity for which the lock is requested
3. (Required/Optional query param) podName—Name of the pod. Required when consumed from SaaS or Pod Manager layer
4. (Optional query param) lockDurationInSeconds—Lock Duration in seconds
5. (Optional query param) description—Description of the task
6. (Optional query param) override—Boolean, default is false. True will override existing lock.
7. (Optional query param) reason—Reason for overriding existing activity lock Response
1. status—String message with the lock acquisition details.
2. resultCode—Numerical representation of the status.

Example Code

```
Request: curl -X POST -H "Content-Type: application/json" -d
'{"activityName":"export","ownerAgent":"exportAgent"}'
localhost/falcm-podlock/v1/pod-
lock/activity?lockDurationInSeconds=21600&override=true
Response:
{
"status": "An activity lock is acquired successfully",
"resultCode": 0
}
```

Figure 9:
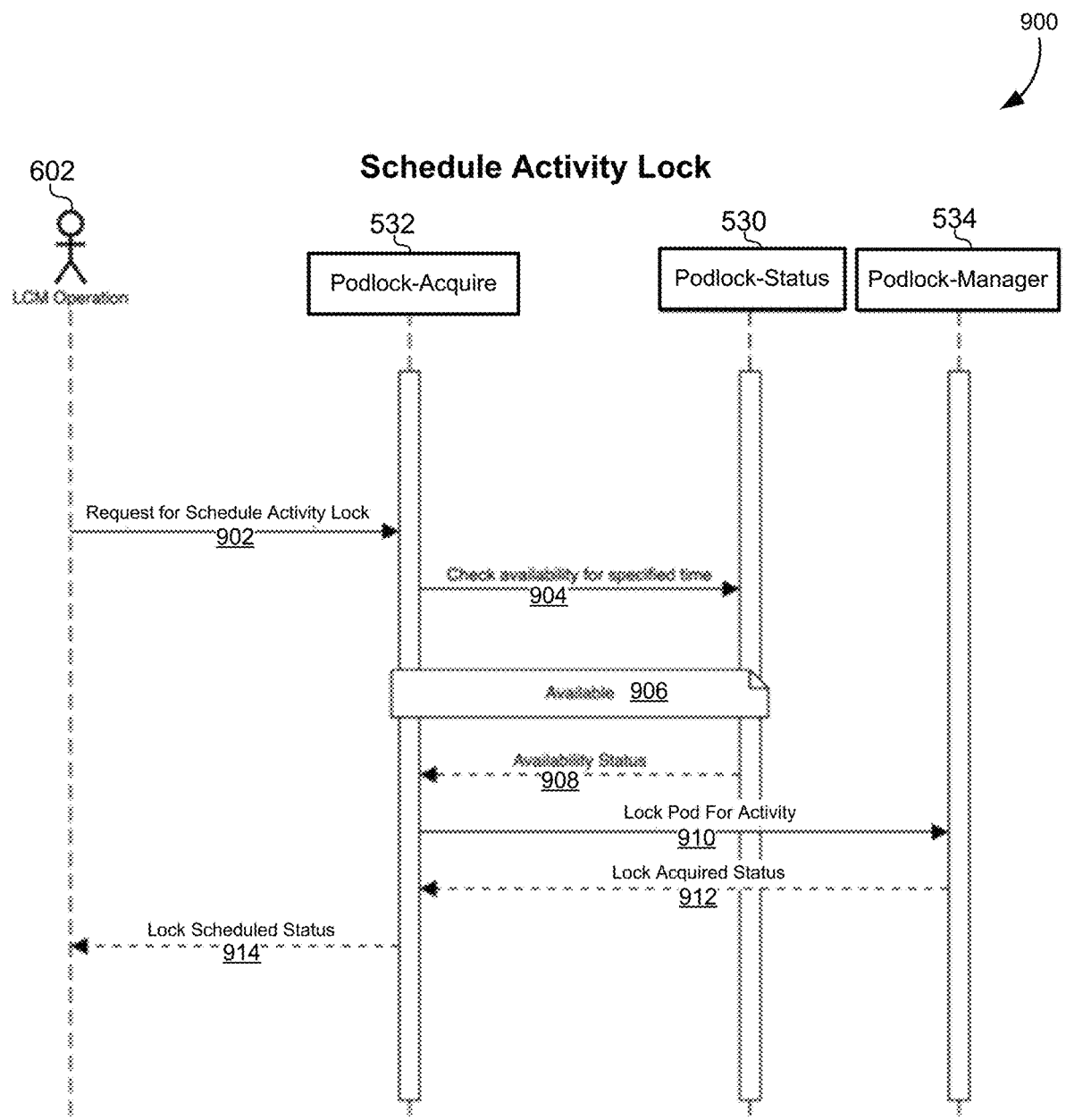
FIG. 9 illustrates a sequence diagram of a process for reserving a lock on an application pod, according to some embodiments.

FIG. 9 illustrates a sequence diagram of a process for reserving a lock on an application pod, according to some embodiments. As described above, an activity lock on an application pod may be reserved for a future time/date. The request may include an optional value specifying the future date/time. The utility 602 may send a request (902) to the acquire process 532, which may query the status process 520 (904) to determine the availability (906) of the lock at the specified future time/date. The availability status may be returned to the acquire process 532 (908), and if the future time/date is available, a request may be submitted to the manager process 534 to lock the application pod for the activity of the utility 602 at that time (910). The manager process 534 may insert a lock for a time interval at the future time/date in the data structure for the corresponding application pod and return a lock status to the acquire process 532 (912). This lack status may then be returned to the utility 602 (914).

In one particular example using a REST API, the following POST/pod-lock/activity code may be used.
POST/Pod-Lock/Activity
1 (Required body param) ownerAgent—logical Name of the requester
2. (Required body param) activityName—Activity for which the lock is requested
3. (Required query param) lockDateInFuture—Future Lock Date and Time
4. (Required/Optional query param) podName—Name of the pod. Required when consumed from SaaS or Pod Manager layer
5. (Optional query param) lockDurationInSeconds—Lock Duration in seconds
6. (Optional query param) description—Description of the task Example Code

```
Request: curl -X POST -H "Content-Type: application/json" -d
'{"activityName":"export","ownerAgent":"exportAgent"}'
localhost/fal
cm-podlock/v1/pod-lock/activity?lockDateInFuture=2020-12-
31T22:00:00.000Z&lockDurationInSeconds=21600
Response:
{
"status": "An activity lock is reserved successfully",
"resultCode": 0
}
```

Figure 10:
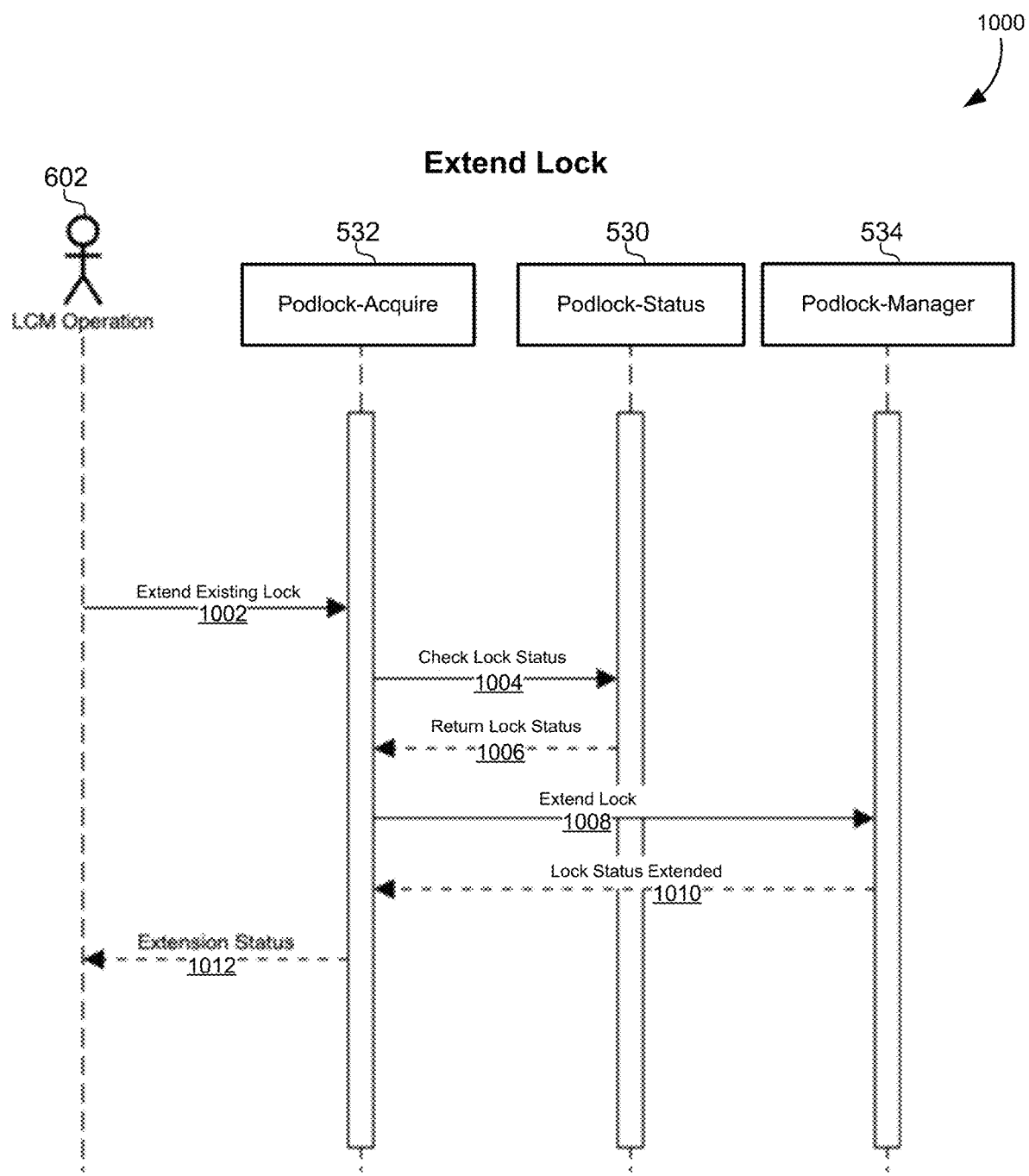
FIG. 10 illustrates a sequence diagram of a process for extending a lock on an application pod, according to some embodiments.

FIG. 10 illustrates a sequence diagram of a process for extending a lock on an application pod, according to some embodiments. A current activity lock may be extended for a requested duration or for a predefined duration by passing a request to the pod lock manager requesting an extension. For example, if the utility 602 causes a process to be executed on an application pod that changes the application pod, and the process does not finish within the original lock reservation time, the utility 602 may submit a supplementary request that extends the existing lock for an additional duration.

The utility 602 may submit a request (1002) that includes some identifying information for the existing lock. This may include an activity name or description, an identifier for the utility 602, and/or an identifier for the application pod. As described above, the status process 530 may check the status of the lock being extended (1004). If the lock is still active (106), then the acquire process 532 may request that the manager process 534 extend the lock (1008). The manager process 534 may increase a time interval for the lock stored in the data structure for the application pod. If the extension is available (e.g., no other utilities have scheduled locks that would prevent the extension), then the lock status may be granted, and a status may be returned (1010), (1012).

In one particular example using a REST API, the following PATCH/pod-lock/activity code may be used.
PATCH/Pod-Lock/Activity
1. (Required body param) ownerAgent—logical Name of the requester
2 (Required body param) activityName—Activity for which the lock is requested
3. (Required/Optional query param) podName—Name of the pod. Required when consumed from SaaS or Pod Manager layer
4. (Optional query param) lockDurationInSeconds—Lock Duration in seconds
5. (Optional query param) description—Description Example

```
Request: curl -X PATCH -H "Content-Type: application/json" -d
'{"activityName":"export","ownerAgent":"exportAgent"}'
localhost/falcm-podlock/v1/pod-
lock/activity?lockDurationInSeconds=3600
Response:
{
"status": "An activity lock is extended successfully",
"resultCode": 0
}
```

Figure 11:
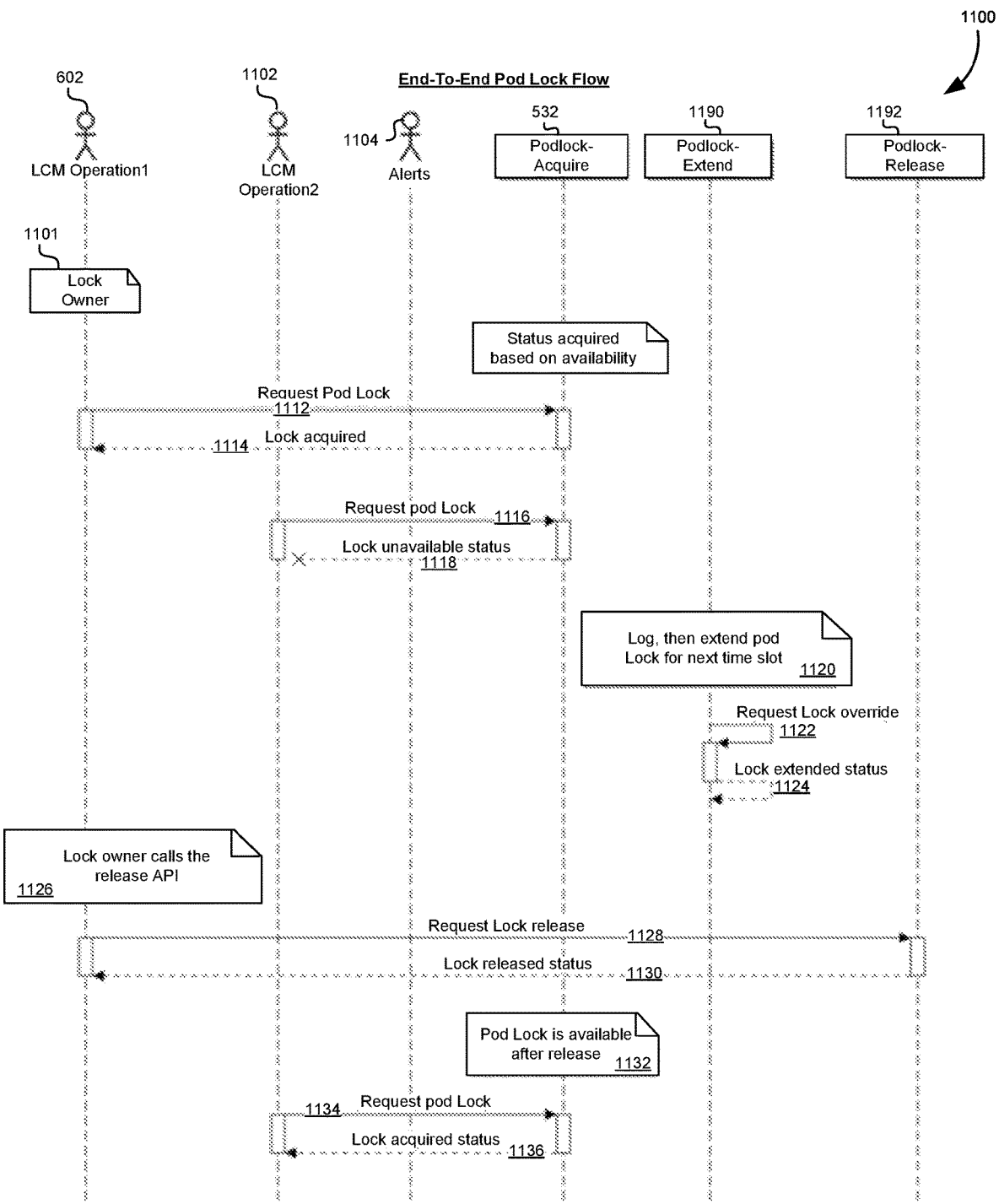
FIG. 11 illustrates a sequence diagram of an example of an end-to-end user interaction flow for the pod lock manager, according to some embodiments.

FIG. 11 illustrates a sequence diagram of an example of an end-to-end user interaction flow for the pod lock manager, according to some embodiments. A lock may be granted to utility 602 in this example. Specifically, utility 602 may request (1112) and receive (1114) a lock using the processes described above. The request was for a current lock, which was granted for a defined time interval. Utility 602 is now the lock owner 1101. During the time interval for which the lock is granted to utility 602, a different utility 1102 may submit a request to be granted a lock on the same application pod. When the request is submitted (1116) to the acquire process 532, a status may be returned indicating that the lock is unavailable (1118), as the lock is currently held by utility 602. Note that without the pod lock manager, utility 1102 would have no way of knowing that it was trying to update the application pod at the same time as utility 602. The pod lock manager avoids this collision and the resulting instability in the application pod that would result by scheduling and arbitrating the request between these different utilities 602, 1102.

This example illustrates additional features that may be provided by the pod lock manager, according to some embodiments. An extend process 1190 may be included as part of the pod lock manager. The extend process 1190 may access and/or write details of the lock to a log, keeping history of locks that have been granted, extended, and/or released for each application pod (1120). When a lock is nearing the end of its pre-scheduled time interval, the extend process 1190 may send a message to the lock owner 1101. For example, utility 602 may receive a message that the lock is due to expire with an option to extend the lock. Responding to the message or submitting a new extend message as described above may extend the time interval for the lock (1124).

During the pendency of the lock owned by utility 602, utility 1102 may submit a request to override the lock (1122). The lock may be overridden based on priorities that are assigned to the different utilities or to the different activities being executed by the utilities, such that higher-priority activities can override lower-priority activities. Some embodiments may send a notification to the current lock owner 1101 requesting permission to override. For example, the pod lock manager may send a message to utility 602 requesting approval to override the current lock in favor of utility 1102. Some embodiments may require administrative approval for a lock to be overridden.

Some embodiments may automatically release the lock at the end of the pre-scheduled time interval for which the lock is originally acquired. Other embodiments may automatically extend a lock once the pre-scheduled time interval expires and send an alert (1104) to the lock user. Some embodiments may also send an alert (1104) to any utilities that have requested a lock that was denied while current lock was active. Each of these alerts may include a link or other interface that allows a request to be automatically submitted.

Some embodiments may allow or require the lock owner 1101 to affirmatively release the lock after it has been granted (1126). The pod lock manager may also include a release process 1192, and a request may be submitted to the release process (1128) to release a current lock. For example, the activity performed by utility 602 may be complete earlier than expected, and the utility 602 may release the lock (1128) such that it is available for other utilities. The release process 1192 may respond with a status indicating that the lock has been released (1130).

Once the pod lock is available after release (1132), an alert may be sent to utility 1102 indicating that the lock is available. Utility 1102 may now submit a request to the acquire process 532 to acquire the lock on the application pod (1134), and a status may be returned (1136) indicating whether the request for the lock was successful. Note that this example described in FIG. 11 illustrates immediate request for a lock. However, the same process may be followed for scheduling future locks using the process described above.

Figure 12:
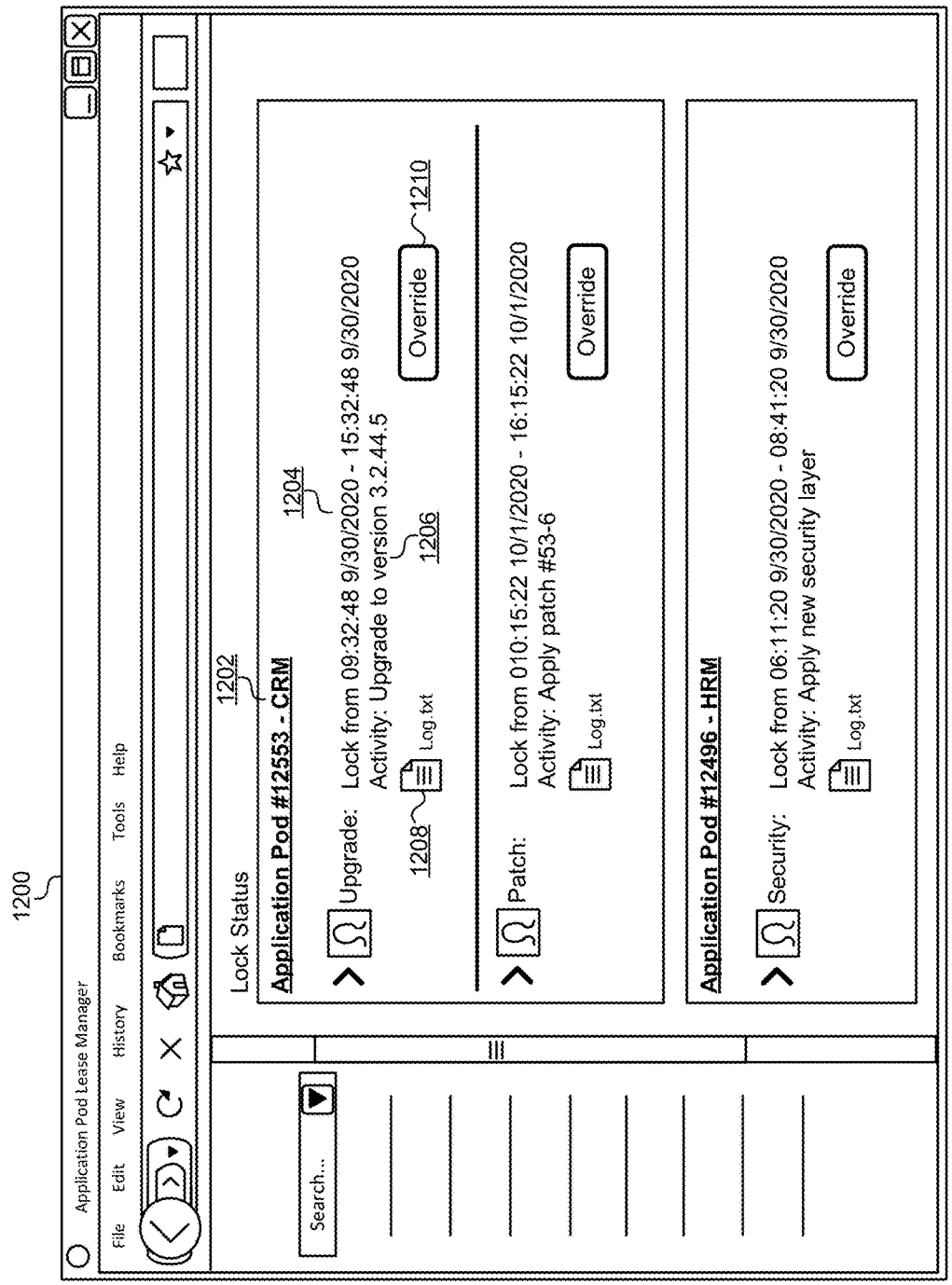
FIG. 12 illustrates a user interface for the pod lock manager, according to some embodiments.

FIG. 12 illustrates a user interface 1200 for the pod lock manager, according to some embodiments. An administrator may have access to all of the locks currently scheduled and in place at the pod lock manager. This user interface 1200 is an example of one way in which information may be presented regarding these lock statuses. Any of the information associated with the lock may be displayed in the user interface 1200, and the particular display and information illustrated in FIG. 12 is provided only by way of example and is not meant to be limiting. Other user interfaces within the scope of these embodiments may include additional information that may be organized and displayed differently.

In this example, the user interface may display lock statuses for individual application pods. A CRM application pod 1202 may include two locks in this example. The status for each lock may include the originating utility or requester (e.g., upgrade, patch, etc.) along with information specific to the lock. This information may include a start time, stop time, a duration, and/or other timing information 1204 related to the lock. The information may also include a description of the activity 1206 associated with the lock. The activity may be initiated or performed by the utility or requester to change the application pod and/or to otherwise have access to the application pod. Some embodiments may include a link to a log file 1208 that may be accessed by clicking on the link to see events associated with the lock that have been recorded by the pod lock manager.

Some embodiments may include a control 1210 that allows the administrative user to override a current lock. The activity 1206 displayed may inform the user of the type of operation being performed during the lock interval, which may be used to determine whether the override should be granted. Other controls not explicitly shown in FIG. 12 may include buttons/controls that trigger sending alerts to utilities. The information in the user interface 1200 may be updated in real time such that it provides an instantaneous view of any lock statuses in the application pod ecosystem.

Figure 13:
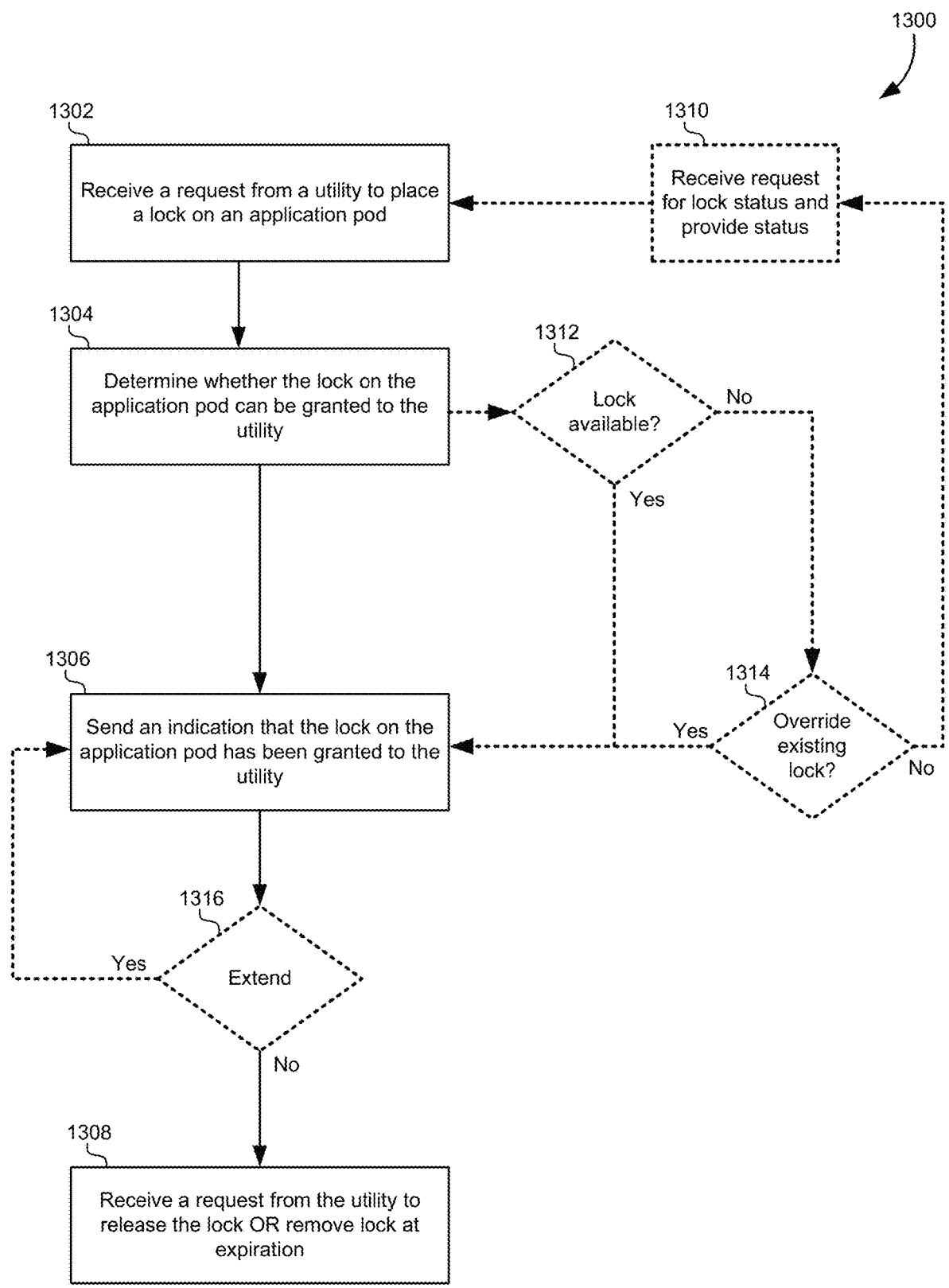
FIG. 13 illustrates a flowchart of a method for managing access to instances of an application pod, according to some embodiments.

FIG. 13 illustrates a flowchart 1300 of a method for managing access to instances of an application pod, according to some embodiments. Although none of the steps illustrated in FIG. 13 are essential, the operations illustrated with dotted lines are emphasized as being optional features that may be added in any combination and without limitation to any of the embodiments described herein. This method may be performed by a pod lock manager as described above in FIGS. 4-5 and throughout this disclosure. Therefore, any of the operations performed in this method or by the pod lock manager in the disclosure above may be combined in any combination as features of some embodiments.

The method may include receiving a request from utility to place a lock on an application pod (1302). The utility may be one of a plurality of different utilities, such as systems provided by development teams or operational teams to provide updates, upgrades, and/or other changes to the application pod. The utility may provide a process configured to change the application pod when the lock on the application pod is granted to the utility. The process may be referred to as an activity that is performed or initiated by the utility. The change may include upgrades, patches, security changes, capacity increases, and/or any other type of change to the software described in this disclosure. The application pod may refer to a plurality of instances of an application pod that are deployed throughout different operating environments. These operating environments may include cloud native environments, SaaS environments, on-premise data centers, and/or any other computing system.

Optionally, this step (1302) may be preceded by a request to receive a lock status from the utility (1310). At any time, the utility may request a lock status for a particular application pod, and the pod lock manager may return a status or numerical code indicating whether a lock is currently in place or whether a lock will be in place at a future time corresponding to the request.

The method may also include determining whether the lock on the application pod can be granted to the utility (1304). This may include determining whether a lock is available (1312) by checking a data structure that stores a schedule of locks during time intervals related to the application pod. If a lock is not available during that time because a lock is held by another utility, a determination may be made as to whether the existing lock can be overridden (1314). This determination may be made based on any of the criteria described above. If the lock cannot be granted, a status may be returned to the requesting utility, and the requesting utility may monitor the status (1310) until the lock becomes available. If the lock is available, or if an existing lock can be overridden, then the lock may be granted.

The method may further include sending an indication that the lock on the application pod has been granted to the utility (1306). The lock on the application pod may prevent processes provided from other utilities from making changes to the application pod while the lock on the application pod is held. For example, if other utilities in the system are subject to approval by the pod lock manager before changes can be made to existing application pods, the protocol established by the pod lock manager may prevent concurrent changes from being made by multiple utilities. Note that this does not require the pod lock manager to actually govern or restrict actions made by the various utilities.

As described above, various options may be used to terminate or end a lock. When a lock is about to expire, an alert may be generated to the originating utility with the option to extend the lock. If the lock is extended (1316), then the time interval associated with the lock may be altered in the data structure at the pod lock manager, and the utility may continue having exclusive access. If the lock is not extended, then the pod lock manager may terminate the lock upon expiration, or the utility may send a request to release the lock (1308).

It should be appreciated that the specific steps illustrated in FIG. 13 provide particular methods of managing access to instances of an application pod according to various embodiments. Other sequences of steps may also be performed according to alternative embodiments. For example, alternative embodiments may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
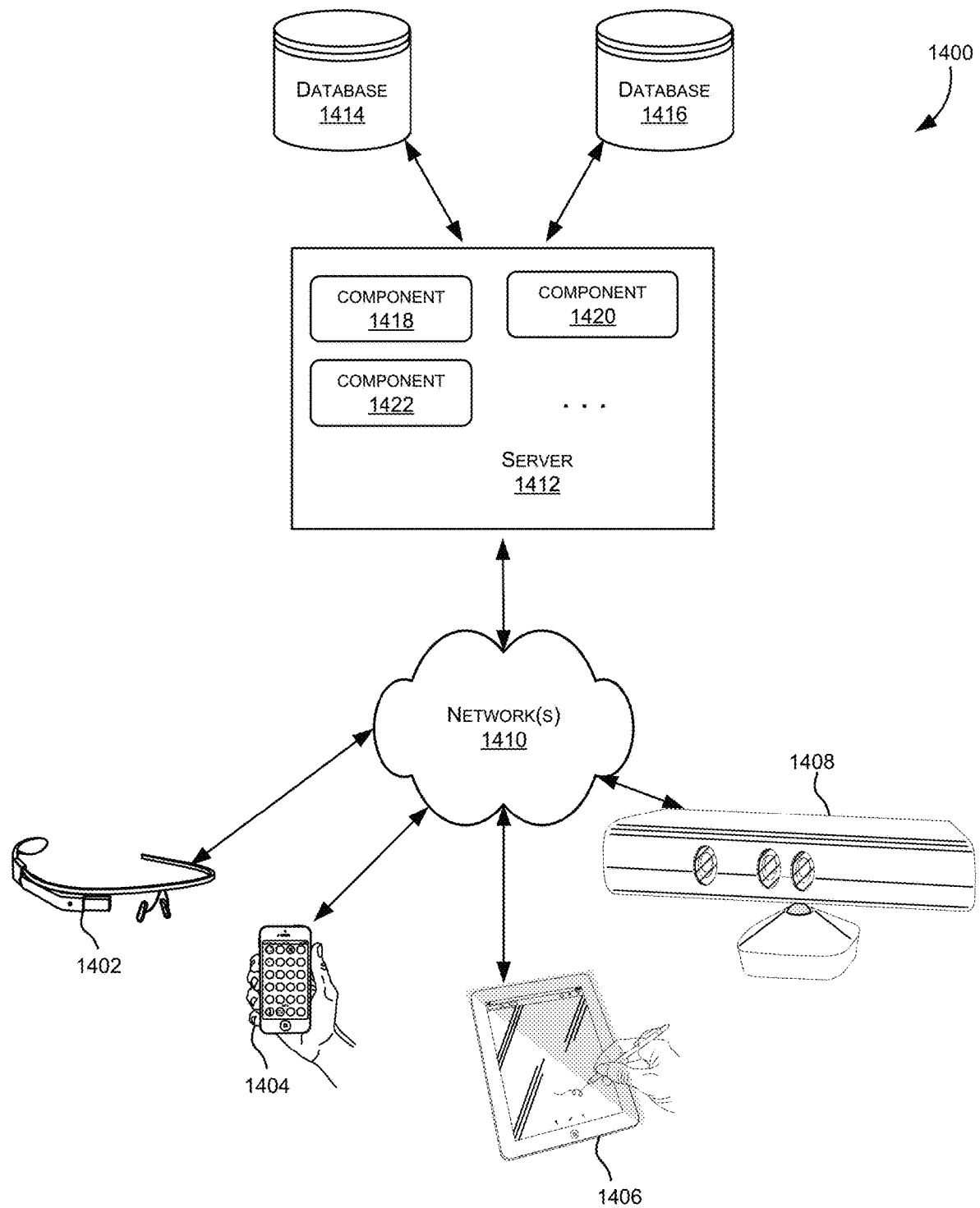
FIG. 14 illustrates a simplified block diagram of a distributed system for implementing some of the embodiments.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
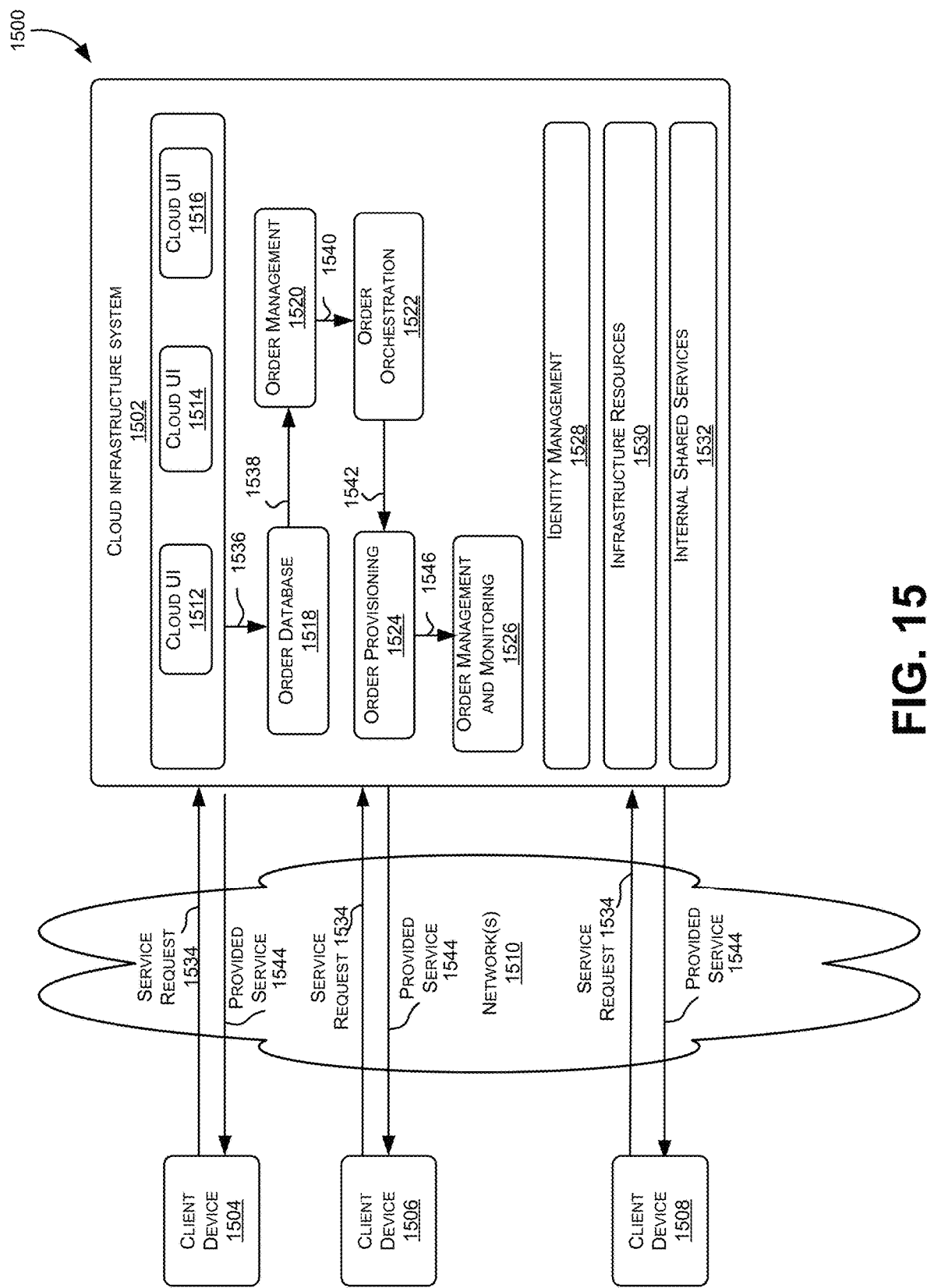
FIG. 15 illustrates a simplified block diagram of components of a system environment by which services provided by the components of an embodiment system may be offered as cloud services.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the system shown in the figure is only one example of a cloud infrastructure system that may incorporate some embodiments. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
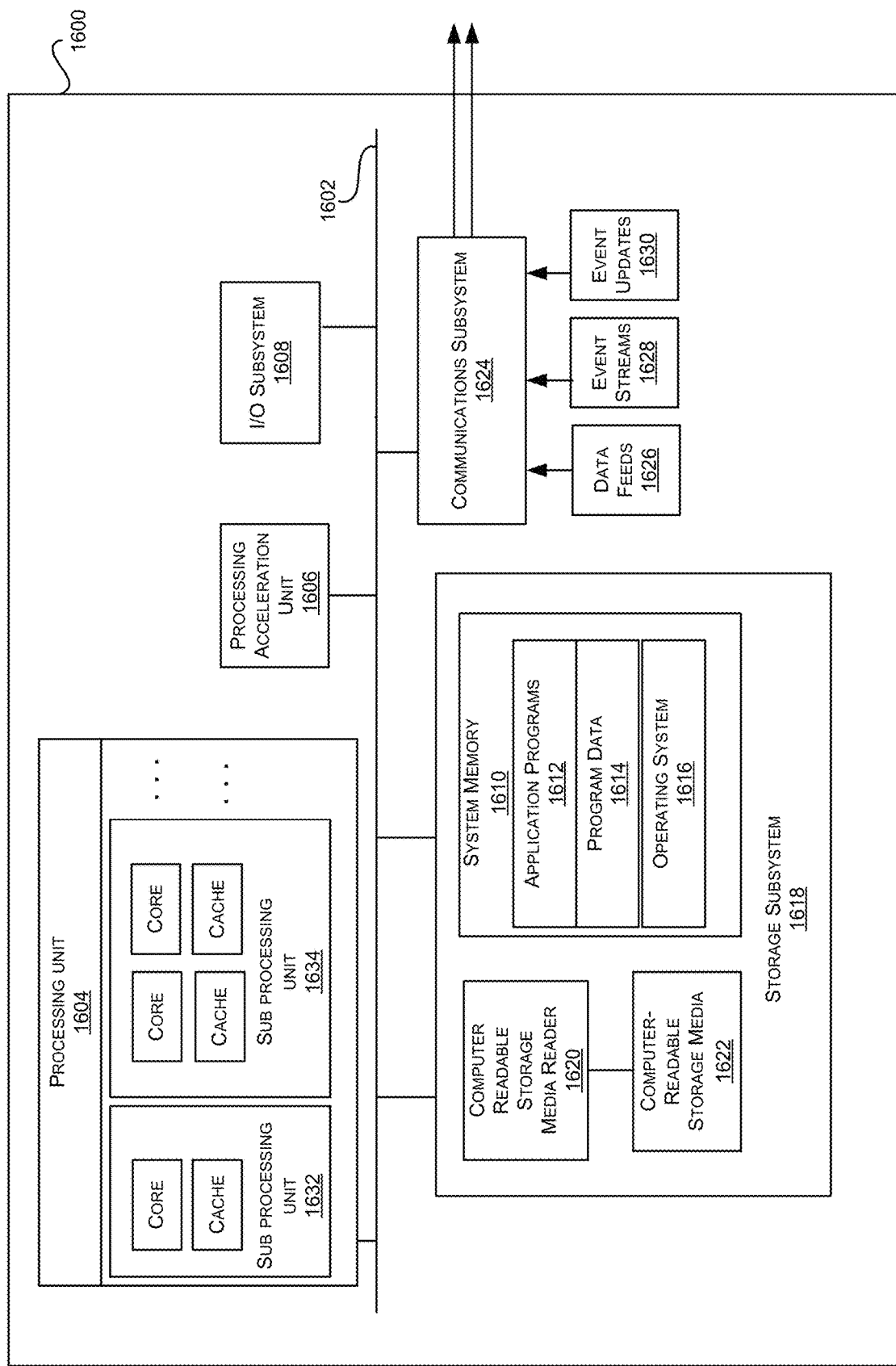
FIG. 16 illustrates an exemplary computer system, in which various embodiments may be implemented.

FIG. 16 illustrates an exemplary computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with some embodiments.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    receiving, at a central pod lock manager, a request from a utility to place a lock on an application pod, wherein a plurality of instances of the application pod are installed across a plurality of operating environments, and the utility provides a process configured to change each of the plurality of instances of the application pod when the lock on the application pod is granted to the utility;
    determining, by the central pod lock manager, that the lock on the application pod can be granted to the utility;
    granting, by the central pod lock manager, the lock on the application pod to the utility; and
    sending, from the central pod lock manager, an indication that the lock on the application pod has been granted to the utility, wherein the lock on the application pod prevents processes provided by other utilities in a plurality of utilities from updating any the plurality of instances of the application pod that are installed across the plurality of operating environments while the lock on the application pod is held by the utility, each of the plurality of application pods remains available to users while the lock on the application pod is held by the utility, and the process changes each of the plurality of instances of the application pod while the lock on the application pod is held by the utility.

2. The non-transitory computer-readable medium of claim 1, wherein the plurality of operating environments comprises a plurality of cloud platforms and an on-premise data center.

3. The non-transitory computer-readable medium of claim 1, wherein the operations further comprise:
    prior to receiving the request from the utility, receiving a status request from the utility to determine whether a lock is already in place from another utility in the plurality of utilities.

4. The non-transitory computer-readable medium of claim 1, wherein the process configured to change each of the plurality of instances of the application pod comprises a process that upgrades the application operating in each of the plurality of instances of the application pod to a new version of the application.

5. The non-transitory computer-readable medium of claim 1, wherein the process configured to change each of the plurality of instances of the application pod comprises a process that applies a patch to the application operating in each of the plurality of instances of the application pod.

6. The non-transitory computer-readable medium of claim 1, wherein the process configured to change each of the plurality of instances of the application pod comprises a process that increases a capacity associated with the application pod.

7. The non-transitory computer-readable medium of claim 1, wherein the operations further comprise maintaining a schedule of locks associated with the application pod.

8. The non-transitory computer-readable medium of claim 1, wherein determining whether the lock on the application pod can be granted to the utility comprises:
    determining whether another utility in the plurality of utilities currently holds a lock on the application pod.

9. The non-transitory computer-readable medium of claim 1, wherein determining whether the lock on the application pod can be granted to the utility further comprises:
    determining whether a lock on the application pod currently held by another utility in the plurality of utilities can be overridden.

10. The non-transitory computer-readable medium of claim 1, wherein the application pod comprises a computer resource, network resource, a storage resource, and executable code for the application.

11. The non-transitory computer-readable medium of claim 1, wherein the operations further comprise:
    receiving a request from the utility to extend the lock on the application pod; and
    determining whether extending the lock on the application pod would interfere with a future lock scheduled by another utility in the plurality of utilities.

12. The non-transitory computer-readable medium of claim 1, wherein the request from the utility to place the lock on the application pod comprises a lock duration and a future time at which the lock should be scheduled to begin.

13. The non-transitory computer-readable medium of claim 1, wherein the request from the utility to place the lock on the application pod comprises an identifier of the utility, an activity description of the process configured to change each of the plurality of instances of the application pod, and an indication of whether a lock override is requested.

14. The non-transitory computer-readable medium of claim 1, wherein the operations further comprise:
    generating an alert to the utility when the lock on the application pod is expired.

15. The non-transitory computer-readable medium of claim 1, wherein the operations further comprise:
    providing a user interface that displays locks that have been granted or reserved for a plurality of application pods.

16. A method of managing changes to distributions of application pods, the method comprising:
    receiving, at a central pod lock manager, a request from a utility to place a lock on an application pod, wherein a plurality of instances of the application pod are installed across a plurality of operating environments, and the utility provides a process configured to change each of the plurality of instances of the application pod when the lock on the application pod is granted to the utility;

determining, by the central pod lock manager, that the lock on the application pod can be granted to the utility;

granting, by the central pod lock manager, the lock on the application pod to the utility; and sending, from the central pod lock manager, an indication that the lock on the application pod has been granted to the utility, wherein the lock on the application pod prevents processes provided by other utilities in a plurality of utilities from updating any the plurality of instances of the application pod that are installed across the plurality of operating environments while the lock on the application pod is held by the utility, each of the plurality of application pods remains available to users while the lock on the application pod is held by the utility, and the process changes each of the plurality of instances of the application pod while the lock on the application pod is held by the utility.

17. A system comprising:

one or more processors; and one or more memory devices comprising instructions that, when executed by the one or more processors, cause the one or more processors to perform operations comprising:

receiving, at a central pod lock manager, a request from a utility to place a lock on an application pod, wherein a plurality of instances of the application pod are installed across a plurality of operating environments, and the utility provides a process configured to change each of the plurality of instances of the application pod when the lock on the application pod is granted to the utility;

determining, by the central pod lock manager, that the lock on the application pod can be granted to the utility;

granting, by the central pod lock manager, the lock on the application pod to the utility; and sending, from the central pod lock manager, an indication that the lock on the application pod has been granted to the utility, wherein the lock on the application pod prevents processes provided by other utilities in a plurality of utilities from updating any the plurality of instances of the application pod that are installed across the plurality of operating environments while the lock on the application pod is held by the utility, each of the plurality of application pods remains available to users while the lock on the application pod is held by the utility, and the process changes each of the plurality of instances of the application pod while the lock on the application pod is held by the utility.

* * * * *